US011871100B2

(12) United States Patent
Huang et al.

(10) Patent No.: US 11,871,100 B2
(45) Date of Patent: Jan. 9, 2024

(54) CAMERA MODULE AND BLOCKING-TYPE PHOTOSENSITIVE ASSEMBLY, MANUFACTURING METHOD THEREOF, AND ELECTRONIC DEVICE

(71) Applicant: NINGBO SUNNY OPOTECH CO., LTD., Zhejiang (CN)

(72) Inventors: Zhen Huang, Zhejiang (CN); Zhongyu Luan, Zhejiang (CN); Zongchun Yang, Zhejiang (CN); Lifeng Kan, Zhejiang (CN); Chenxiang Xu, Zhejiang (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 286 days.

(21) Appl. No.: 17/600,735

(22) PCT Filed: Mar. 2, 2020

(86) PCT No.: PCT/CN2020/077379
§ 371 (c)(1),
(2) Date: Oct. 1, 2021

(87) PCT Pub. No.: WO2020/199819
PCT Pub. Date: Oct. 8, 2020

(65) Prior Publication Data
US 2022/0201169 A1    Jun. 23, 2022

(30) Foreign Application Priority Data

Apr. 2, 2019  (CN) ........................ 201910259927.X
Apr. 2, 2019  (CN) .......................... 201920440006.9

(51) Int. Cl.
*H04N 23/55*     (2023.01)
*G03B 1/00*      (2021.01)
(Continued)

(52) U.S. Cl.
CPC ............. *H04N 23/55* (2023.01); *G03B 11/00* (2013.01); *G02B 7/021* (2013.01)

(58) Field of Classification Search
CPC ........ H04N 23/55; H04N 23/54; H04N 23/52; H04N 23/57; H04N 23/10; G03B 11/00;
(Continued)

(56) References Cited

U.S. PATENT DOCUMENTS 9,568,743 B2 *  2/2017  Hayashi .................... G03B 3/10
9,885,879 B2 *  2/2018  Kim .......................... G02B 7/09
(Continued)

FOREIGN PATENT DOCUMENTS

CN    205961266    2/2017
CN    206596090    10/2017
(Continued)

OTHER PUBLICATIONS

International Search Report dated Jun. 3, 2020, in International (PCT) Application No. PCT/CN2020/077379, with English translation.
(Continued)

*Primary Examiner* — Pritham D Prabhakher
(74) *Attorney, Agent, or Firm* — Wenderoth, Lind & Ponack, L.L.P.

(57) ABSTRACT

Disclosed are a camera module, a blocking-type photosensitive assembly, a manufacturing method thereof, and an electronic device. The camera module includes a blocking-type photosensitive assembly and at least one motor camera lens assembly arranged on the blocking-type photosensitive assembly. The blocking-type photosensitive assembly includes a molded photosensitive assembly and a blocking structure arranged on the molded photosensitive assembly. A blocking surface of the blocking structure is higher than an upper surface of a filter element, and at least a part of the
(Continued)

projection of the blocking surface of the blocking structure on the molded photosensitive assembly overlaps with the projection of an optical lens of the motor camera lens assembly on the molded photosensitive assembly to block the optical lens from directly contacting the filter element.

20 Claims, 10 Drawing Sheets

(51) Int. Cl.
*G02B 7/02* (2021.01)
*G03B 11/00* (2021.01)

(58) Field of Classification Search
CPC ...... G02B 7/021; H05K 1/0274; H05K 1/118; H01L 27/14621; H01L 27/14618; H01L 27/14698; H01L 2224/92247; H01L 2224/83101; H01L 2224/83192; H01L 2924/16195
USPC .......................................................... 348/374
See application file for complete search history.

(56) References Cited

U.S. PATENT DOCUMENTS

| | | | |
|---|---|---|---|
| 10,281,737 B2* | 5/2019 | Park | G03B 5/00 |
| 10,401,591 B2* | 9/2019 | Tseng | H02K 41/0354 |
| 10,423,006 B2* | 9/2019 | Taguchi | H04N 23/55 |
| 10,437,007 B2* | 10/2019 | Jeong | G03B 3/10 |
| 10,747,014 B2* | 8/2020 | Kim | G02B 7/08 |
| 2009/0273048 A1* | 11/2009 | Chen | H01L 27/14618 |
| | | | 257/432 |
| 2010/0027138 A1* | 2/2010 | Terada | G02B 7/102 |
| | | | 348/340 |
| 2010/0315546 A1* | 12/2010 | Saito | H01L 27/14625 |
| | | | 348/374 |
| 2012/0174574 A1* | 7/2012 | Kotanagi | G02B 7/023 |
| | | | 60/528 |
| 2016/0178923 A1* | 6/2016 | Hayashi | G03B 3/10 |
| | | | 359/557 |
| 2016/0187668 A1* | 6/2016 | Hayashi | G02B 13/001 |
| | | | 359/507 |
| 2016/0187670 A1* | 6/2016 | Kim | G02B 7/08 |
| | | | 359/557 |
| 2017/0363838 A1 | 12/2017 | Jeong | |
| 2018/0120586 A1 | 5/2018 | Kim | |
| 2019/0148429 A1 | 5/2019 | Wang et al. | |

FOREIGN PATENT DOCUMENTS

| | | |
|---|---|---|
| CN | 206629168 | 11/2017 |
| CN | 206878952 | 1/2018 |
| CN | 207010805 | 2/2018 |
| CN | 107957649 | 4/2018 |
| CN | 207382411 | 5/2018 |
| CN | 208461938 | 2/2019 |
| CN | 209881889 | 12/2019 |
| KR | 10-0808017 | 2/2008 |
| TW | 201734622 | 10/2017 |
| TW | 201801512 | 1/2018 |
| TW | 201814895 | 4/2018 |
| TW | M559558 | 5/2018 |
| WO | 2016/117866 | 7/2016 |

OTHER PUBLICATIONS

Extended European Search Report dated Apr. 25, 2022, in corresponding European Patent Application No. 20783615.6.

* cited by examiner

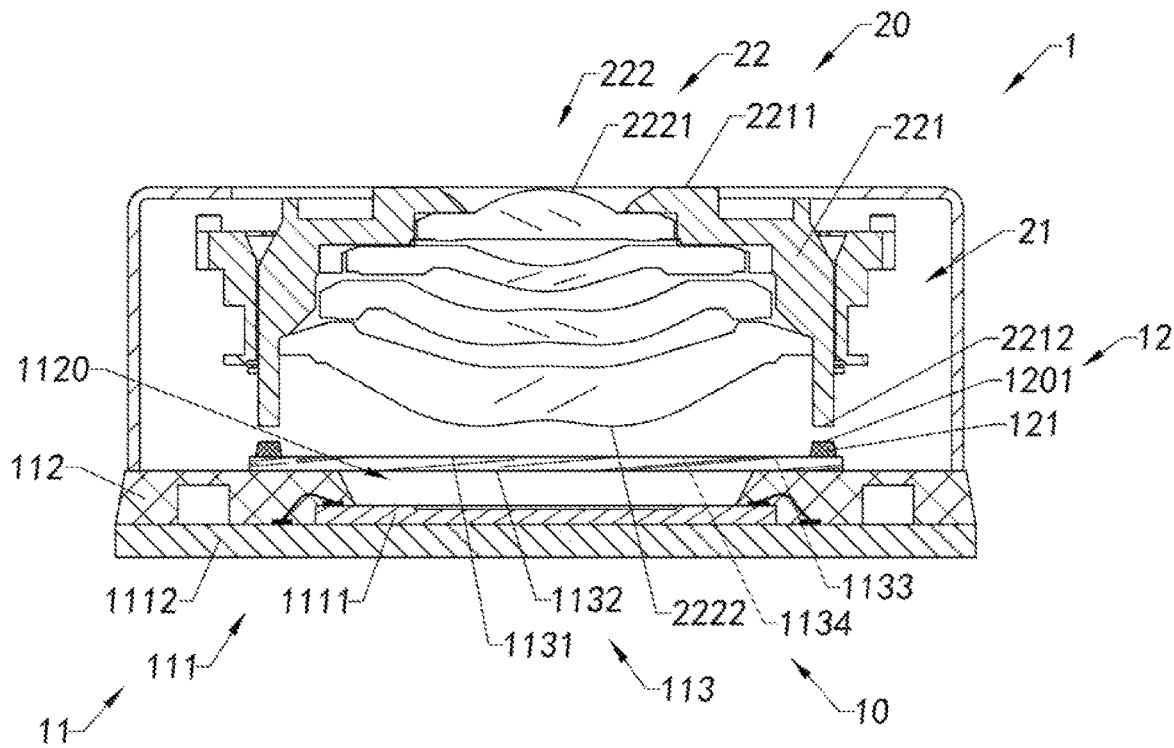

Figure 7E

| Correspondingly arranging a blocking structure 12 on a molded photosensitive assembly 11 to form a blocking-type photosensitive assembly 10, wherein a blocking surface 1201 of the blocking structure 12 is higher than an upper surface 1131 of a filter element 113 of the molded photosensitive assembly 11. | —S110 |

↓

| Correspondingly arranging at least one motor camera lens assembly 20 on the blocking-type photosensitive assembly 10, so that the blocking surface 1201 of the blocking structure 12 corresponds to an optical lens 22 of the motor camera lens assembly 20, wherein when the optical lens 22 can be driven by a motor 21 of the motor camera lens assembly 20 to approach an imaging assembly 111 of the molded photosensitive assembly 11, the blocking structure 12 can prevent the optical lens 22 from directly contacting the filter element 113 | —S120 |

Figure 8

CAMERA MODULE AND BLOCKING-TYPE PHOTOSENSITIVE ASSEMBLY, MANUFACTURING METHOD THEREOF, AND ELECTRONIC DEVICE

TECHNICAL FIELD

The present application relates to field of optical imaging technology, in particular to a camera module and a blocking-type photosensitive assembly, a manufacturing method thereof, and an electronic device.

BACKGROUND

In recent years, electronic products and intelligent devices and the like have increasingly tended to be lighter, thinner and more high-performance. This development trend of electronic products and intelligent devices has puts forward more stringent requirements for the size and imaging capability of camera modules as one of the standard configurations of electronic products and intelligent devices. However, as consumers have higher and higher requirements for high-pixel, high-performance camera modules, the height of the camera modules continues to increase. The main reason for this is that as the pixels of the camera module become higher, the camera lens height of the camera module will increase, but a thickness of a photosensitive chip package part is difficult to reduce. In particular, there is a principle in an optical design of the camera lens: a camera lens thickness ratio of the camera module has a minimum value to ensure the feasibility of an optical system, that is, when size of an image surface of the camera lens of the camera module is given, the thickness of the camera lens has a certain range of values. In other words, the higher the pixels of the camera module are, the larger the image surface of the camera lens required is, and the higher the height of the camera lens is.

At present, in order to reduce the height of the camera module, the height of the camera lens in the camera module is usually reduced as much as possible. On one hand, the optical design can be optimized, and the height of the optical system can be designed to the minimum. On the other hand, the structure design of the camera lens barrel can be optimized to make the lowest end of the camera lens barrel flush with the lowest end of the lens group or higher than the lowest end of the lens group (i.e., the last lens in the lens group protrudes from the lowest end of the lens barrel) to minimize the height of the lens barrel that limits the height of the camera lens. In addition, in order to further reduce the height of the camera module, a reasonable optical system design can also be used to reduce the back focus of the camera lens to a certain extent, so that the distance between the photosensitive chip and the camera lens is further reduced. In order to achieve this object, a chip circuit board assembly is usually packaged by molding, and a lens holder used to mount a color filter and camera lens is removed. Instead, the color filter is directly mounted on the molded surface to further reduce the height of the camera module.

However, this also brings new risks. For example, although the removal of the lens holder makes the distance between the lens barrel or lens and the filter closer, which helps to reduce the height of the camera module, but in the assembly process of the camera module or in the process of focusing or focus adjustment, the camera lens of the camera module easily collides with the filter to break the filter, thereby causing damage to the camera module.

SUMMARY OF THE INVENTION

An object of the present invention is to provide a camera module, a blocking-type photosensitive assembly, a manufacturing method thereof, and an electronic device, which can reduce the risk of damage to the camera module, which helps to improve the overall reliability of the camera module.

Another object of the present invention is to provide a camera module, a blocking-type photosensitive assembly, a manufacturing method thereof, and an electronic device, which can avoid collision of the filter element, so as to effectively reduce the risk of the filter element cracking.

Another object of the present invention is to provide a camera module, a blocking-type photosensitive assembly, a manufacturing method thereof, and an electronic device, wherein, in an embodiment of the present invention, the camera module can be arranged with a blocking structure between the molded photosensitive assembly and the optical lens, so as to avoid direct collision between the optical lens and the filter element, which helps to reduce the risk of the filter element cracking.

Another object of the present invention is to provide a camera module, a blocking-type photosensitive assembly, a manufacturing method thereof, and an electronic device, wherein, in an embodiment of the present invention, the blocking structure of the camera module can be arranged on the molded base of the molded photosensitive assembly, so as to avoid the optical lens from exerting any pressure on the filter element, which helps to protect the filter element from damage.

Another object of the present invention is to provide a camera module, a blocking-type photosensitive assembly, a manufacturing method thereof, and an electronic device, wherein, in an embodiment of the present invention, the blocking structure of the camera module corresponds to the lens barrel of the optical lens, so as to avoid collision between the lens group of the optical lens and the blocking structure, which helps to protect the lens group of the optical lens from damage.

Another object of the present invention is to provide a camera module, a blocking-type photosensitive assembly, a manufacturing method thereof, and an electronic device, wherein, in an embodiment of the present invention, the blocking structure of the camera module is located outside of the longer edge of the filter element of the molded photosensitive assembly, so that a contact area between the blocking structure and the optical lens can be increased, so as to reduce the collision force between the optical lens and the blocking structure, which helps to protect the optical lens.

Another object of the present invention is to provide a camera module, a blocking-type photosensitive assembly, a manufacturing method thereof, and an electronic device, wherein, in an embodiment of the present invention, the blocking structure of the camera module is a linear shaped protrusion, which helps to further increase the contact area between the blocking structure and the optical lens.

Another object of the present invention is to provide a camera module, a blocking-type photosensitive assembly, a manufacturing method thereof, and an electronic device, wherein, in an embodiment of the present invention, the blocking structure of the camera module is a point shaped protrusion, which helps to reduce the overall weight of the camera module while avoiding collision.

Another object of the present invention is to provide a camera module, a blocking-type photosensitive assembly, a manufacturing method thereof, and an electronic device, wherein, in an embodiment of the present invention, the blocking structure of the camera module is integrally formed on the molded base of the molded photosensitive assembly, so as to simplify the assembly process of the camera module.

Another object of the present invention is to provide a camera module, a blocking-type photosensitive assembly, a manufacturing method thereof, and an electronic device, wherein, in an embodiment of the present invention, the blocking structure of the camera module is adhered to the molded base of the molded photosensitive assembly, which helps to simplify the manufacturing technique of the molded base of the molded photosensitive assembly.

Another object of the present invention is to provide a camera module, a blocking-type photosensitive assembly, a manufacturing method thereof, and an electronic device, wherein, in an embodiment of the present invention, the blocking structure of the camera module is made of elastic material, so as to apply a buffering effect between the blocking structure and the optical lens, which helps to protect the optical lens from damage.

Another object of the present invention is to provide a camera module, a blocking-type photosensitive assembly, a manufacturing method thereof, and an electronic device, wherein, in an embodiment of the present invention, a blocking surface of the blocking structure of the camera module is provided with a buffer film, so as to apply a buffering effect when the optical lens collides with the blocking structure to prevent the optical lens from being damaged due to the collision.

Another object of the present invention is to provide a camera module, a blocking-type photosensitive assembly, a manufacturing method thereof, and an electronic device, wherein, in an embodiment of the present invention, the blocking structure of the camera module is directly arranged on the edge of the filter element, and the blocking structure is made of elastic material, so as to apply a buffering effect between the filter element and the optical lens, which helps to avoid the filter element or the optical lens from being damaged.

Another object of the present invention is to provide a camera module, a blocking-type photosensitive assembly, a manufacturing method thereof, and an electronic device, wherein, in order to achieve the above-mentioned object, the present invention does not need to use expensive materials or complicated structures. Therefore, the present invention successfully and effectively provides a solution that not only provides a simple camera module and a blocking-type photosensitive assembly, a manufacturing method thereof, and an electronic device, but also increases the practicality and reliability of the camera module, the blocking-type photosensitive assembly, the manufacturing method thereof, and the electronic device.

In order to achieve at least one of the above-mentioned objects or other objects and advantages, the present invention provides a camera module, including:

a blocking-type photosensitive assembly, wherein the blocking-type photosensitive assembly includes:
      a molded photosensitive assembly, wherein the molded photosensitive assembly includes:
         an imaging assembly;
         a molded base, wherein the molded base embeds a part of the imaging assembly, and the molded base has a light window, and the light window corresponds to a photosensitive path of the imaging assembly; and
         a filter element, wherein the filter element is correspondingly arranged on the light window of the molded base; and
      a blocking structure, wherein the blocking structure is arranged on the molded photosensitive assembly, and the blocking structure has a blocking surface; and
   at least one motor camera lens assembly, wherein each motor camera lens assembly includes:
      a motor, wherein the motor is arranged on the blocking-type photosensitive assembly; and
      an optical lens, wherein the optical lens is drivably arranged on the motor, and the optical lens corresponds to the photosensitive path of the imaging assembly,
   wherein the blocking surface of the blocking structure is higher than an upper surface of the filter element, and at least a part of the projection of the blocking surface of the blocking structure on the molded photosensitive assembly overlaps with the projection of the optical lens on the molded photosensitive assembly.

In an embodiment of the present invention, the optical lens includes a lens barrel and a lens group, the lens group is assembled to the lens barrel, and the lens barrel is movably mounted on the motor, wherein the blocking surface of the blocking structure corresponds to a light-exit end surface of the lens barrel, so that the blocking surface of the blocking structure can directly contact the light-exit end surface of the lens barrel to block the optical lens from directly contacting the filter element.

In an embodiment of the present invention, a distance between the blocking surface of the blocking structure and the light-exit end surface of the lens barrel is smaller than a shortest distance between the upper surface of the filter element and the light-exit surface of the lens group.

In an embodiment of the present invention, the blocking structure is correspondingly arranged on the molded base so as to extend from the molded base toward the lens barrel of the optical lens.

In an embodiment of the present invention, the blocking structure is adhered to the molded base.

In an embodiment of the present invention, the blocking structure is integrally molded on the molded base to form a protrusion on a surface of the molded base.

In an embodiment of the present invention, the blocking structure is correspondingly arranged at an edge region of the filter element.

In an embodiment of the present invention, the molded photosensitive assembly further includes a mounting bracket, the mounting bracket is arranged on the molded base, and the filter element is correspondingly mounted on the mounting bracket, wherein the blocking structure is correspondingly arranged on the mounting bracket, so that the mounting bracket and the blocking structure are combined to form a blocking-type mounting bracket.

In an embodiment of the present invention, the blocking structure is integrally molded on the mounting bracket to form a protrusion on the mounting bracket.

In an embodiment of the present invention, wherein the blocking structure includes at least one strip shaped protrusion member, wherein each strip shaped protrusion member extends along the edge of the filter element to form a linear shaped protrusion, wherein an upper side surface of the strip shaped protrusion member serves as the blocking surface of the blocking structure.

In an embodiment of the present invention, a back focus of the optical lens is not greater than 0.6 mm.

In an embodiment of the present invention, at least a part of the projection of the light-exit end surface of the lens barrel of the optical lens on the molded photosensitive assembly overlaps with the projection of the blocking surface of the blocking structure on the molded photosensitive assembly.

In an embodiment of the present invention, an inner edge of the projection of the blocking surface of the blocking structure on the molded photosensitive assembly and an inner edge of the projection of the light-exit end surface of the lens barrel on the molded photosensitive assembly do not intersect.

In an embodiment of the present invention, the strip shaped protrusion member extends along a long edge of the filter element.

In an embodiment of the present invention, the blocking structure includes two strip shaped protrusion members, wherein the strip shaped protrusion members are respectively located outside of the two long edges of the filter element.

In an embodiment of the present invention, the blocking structure further includes at least one buffer layer, wherein the buffer layer is arranged on the upper side surface of the strip shaped protrusion member, and the buffer layer is made of elastic material.

In an embodiment of the present invention, the blocking structure includes at least one column shaped protrusion member, wherein one end of each column shaped protrusion member is connected to the molded photosensitive assembly, and the other end of the column shaped protrusion member extends in a direction away from the molded base, so as to form a point shaped protrusion, wherein the end surface of the other end of the column shaped protrusion member serves as the blocking surface of the blocking structure.

In an embodiment of the present invention, at least a part of the projection of the light-exit end surface of the lens barrel of the optical lens on the molded photosensitive assembly overlaps with the projection of the blocking surface of the blocking structure on the molded photosensitive assembly.

In an embodiment of the present invention, the blocking structure is made of elastic material.

In an embodiment of the present invention, the motor of the motor camera lens assembly is directly mounted on the molded base of the molded photosensitive assembly.

In an embodiment of the present invention, the motor of the motor camera lens assembly is directly mounted on the blocking surface of the blocking structure.

According to another aspect of the present invention, the present invention further provides a camera module, including:
  a blocking-type photosensitive assembly, wherein the blocking-type photosensitive assembly includes:
    a molded photosensitive assembly, wherein the molded photosensitive assembly includes:
      an imaging assembly;
      a molded base, wherein the molded base embeds a part of the imaging assembly, and the molded base has a light window, and the light window corresponds to a photosensitive path of the imaging assembly; and
      a filter element, wherein the filter element is correspondingly arranged on the light window of the molded base; and
    a blocking structure, wherein the blocking structure is arranged on the molded photosensitive assembly, and the blocking structure has a blocking surface; and
  at least one motor camera lens assembly, wherein each motor camera lens assembly includes:
    a motor, wherein the motor is arranged on the blocking-type photosensitive assembly; and
    an optical lens, wherein the optical lens is drivably arranged on the motor, and the optical lens corresponds to the photosensitive path of the imaging assembly,
  wherein the blocking surface of the blocking structure corresponds to the optical lens, and the blocking surface of the blocking structure is higher than an upper surface of the filter element, so that before the optical lens is driven by the motor to approach to the imaging assembly and the optical lens contacts the upper surface of the filter element, the blocking surface of the blocking structure can first contact the optical lens to block the optical lens from directly contacting the filter element.

According to another aspect of the present invention, the present invention further provides a blocking-type photosensitive assembly for assembling a camera module with at least one motor camera lens assembly, wherein the motor camera lens assembly includes a motor and an optical lens, wherein the blocking-type photosensitive assembly includes:
  a molded photosensitive assembly, wherein the molded photosensitive assembly includes:
    an imaging assembly;
    a molded base, wherein the molded base embeds a part of the imaging assembly, the molded base has a light window, and the light window corresponds to the photosensitive path of the imaging assembly; and
    a filter element, wherein the filter element is correspondingly arranged on the light window of the molded base; and
  a blocking structure, wherein the blocking structure is arranged on the molded photosensitive assembly, and the blocking structure has a blocking surface, and the blocking surface of the blocking structure is higher than an upper surface of the filter element, wherein the blocking surface of the blocking structure is adapted to corresponding to the optical lens of the motor camera lens assembly, so that before the optical lens is driven by the motor to approach to the imaging assembly and the optical lens contacts the upper surface of the filter element, the blocking structure can first contact the optical lens to block the optical lens from directly contacting the filter element.

In an embodiment of the present invention, at least a part of the projection of the blocking surface of the blocking structure on the molded photosensitive assembly is adapted to overlapping with the projection of a light-exit end surface of a lens barrel of the optical lens on the molded photosensitive assembly.

In an embodiment of the present invention, the blocking structure is adhered to the molded base.

In an embodiment of the present invention, the blocking structure is integrally molded on the molded base to form a protrusion on a surface of the molded base.

In an embodiment of the present invention, the blocking structure includes at least one strip shaped protrusion member, wherein each strip shaped protrusion member extends along an edge of the filter element to form a linear shaped protrusion, wherein an upper side surface of the strip shaped protrusion member serves as the blocking surface of the blocking structure.

In an embodiment of the present invention, the strip shaped protrusion member has a trapezoidal cross-section.

According to another aspect of the present invention, the present invention further provides an electronic device, including:

an electronic device body; and at least one camera module described above, wherein each camera module is respectively arranged on the electronic device body for acquiring images.

According to another aspect of the present invention, the present invention further provides a method for manufacturing a camera module, including the following steps:

correspondingly arranging a blocking structure on a molded photosensitive assembly to form a blocking-type photosensitive assembly, wherein a blocking surface of the blocking structure is higher than an upper surface of a filter element of the molded photosensitive assembly; and correspondingly arranging at least one motor camera lens assembly on the blocking-type photosensitive assembly, wherein the blocking surface of the blocking structure corresponds to the optical lens of the motor camera lens assembly, so that when the optical lens is driven by the motor of the motor camera lens assembly to approach the imaging assembly of the molded photosensitive assembly, the blocking structure can prevent the optical lens from directly contacting the filter element.

In an embodiment of the present invention, the blocking structure is directly adhered to a molded base of the molded photosensitive assembly.

In an embodiment of the present invention, the blocking structure is integrally molded on a molded base of the molded photosensitive assembly.

With the understanding of the following description and accompanying drawings, the further objectives and advantages of the present invention are fully embodied.

These and other objectives, features and advantages of the present invention are fully embodied by the following detailed description, drawings and claims.

BRIEF DESCRIPTION OF THE DRAWINGS

FIG. 7E shows a fifth modified implementation mode of the camera module according to the above-mentioned embodiment of the present invention.

FIG. 8 is a schematic flowchart of a method for manufacturing a camera module according to an embodiment of the present invention.

DETAILED DESCRIPTION OF THE INVENTION

Figure 1:
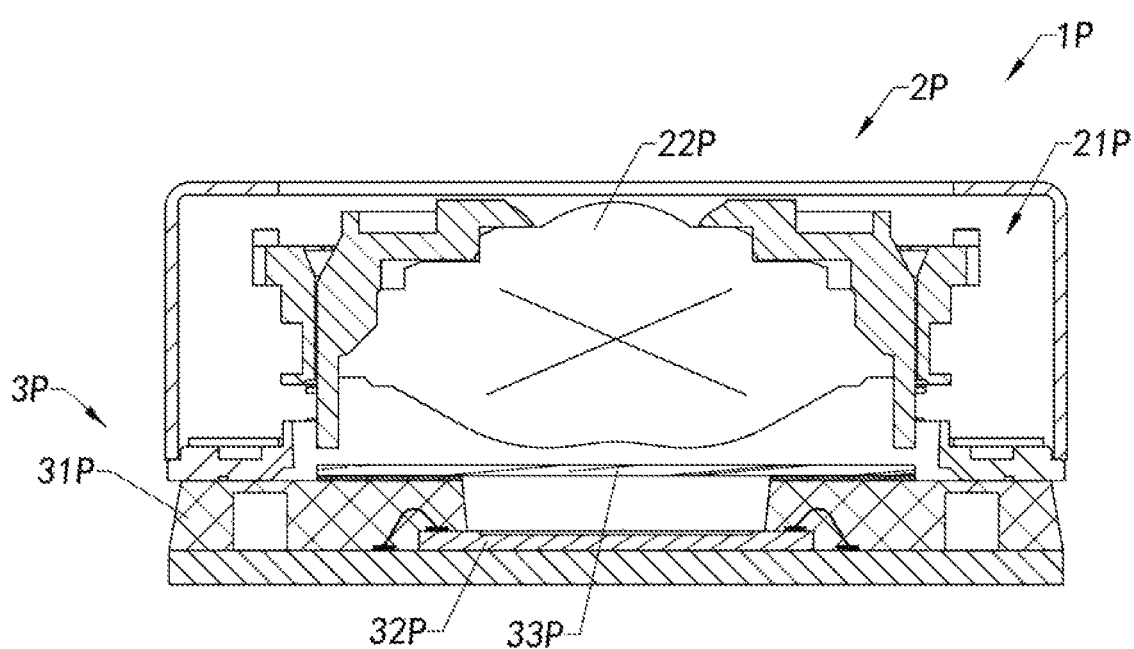
FIG. 1 shows a schematic cross-sectional view of a conventional camera module.

The following description is used to disclose the present invention, so that a person skilled in the art can implement the present invention. The preferred embodiments in the following description are only examples, and a person skilled in the art could conceive of other obvious variations. The basic principles of the present invention defined in the following description may be applied to other implementation modes, modifications, improvements, equivalents, and other technical solutions that do not depart from the spirit and scope of the present invention.

A person skilled in the art should understand that, in the disclosure of the present invention, the terms "longitudinal", "lateral", "upper", "lower", "front", "rear", "left", "right", "vertical", "horizontal", "top", "bottom", "inner", "outer", and the like indicate orientations or positional relationships based on the orientations or positional relationships shown in the drawings. The terms are only for description convenience of the present invention and simplification of the description, but do not show or imply that the indicated devices or elements must have specific orientations or be constructed and operated in specific orientations. Therefore, the terms should not be understood to limit the present invention.

In the present invention, the term "a" in the claims and specification should be understood as "one or more", that is, in one embodiment, the number of an element may be one, and in another embodiment, the number of the element may be multiple. Unless it is clearly stated in the disclosure of the present invention that the number of the element is only one, the term "a" cannot be understood as unique or singular, and the term "a" cannot be understood as a limitation on the number.

In the description of the present invention, it should be understood that "first", "second", and the like are only used for descriptive purposes, and cannot be understood as indicating or implying relative importance. In the description of the present invention, it should be noted that, unless otherwise specified and defined, "connected" should be understood in a broad sense, for example, it may be fixedly connected, detachably connected or integrally connected; it may be mechanically connected or electrically connected; or it may be directly connected or connected by a medium. A person of ordinary skill in the art could understand the specific meanings of the above terms in the present invention according to specific circumstances.

In the description of this specification, the terms "one embodiment", "some embodiments", "an example", "a specific embodiment", or "some examples" and the like mean that specific features, structures, materials or characteristics described in conjunction with the embodiments or examples are included in at least one embodiment or example of the present invention. In the description, the schematic descriptions of the above terms do not necessarily refer to the same embodiment or example. Moreover, the specific features, structures, materials or characteristics described can be combined appropriately in one or more embodiments or examples. In addition, different embodiments or examples described in this specification and features of different embodiments or examples can be combined by a person skilled in the art without conflicting with each other.

In order to reduce the height of a camera module, for a conventional camera module, a back focus of the camera lens is usually designed to be very short through optical design, and then an IOM (IR on Molding, a filter element is above a mold) structure is adopted, that is, the filter element is directly attached to a molded base to reduce the thickness of a molded photosensitive assembly. Illustratively, as shown in FIG. 1, a conventional camera module 1P usually includes a motor camera lens assembly 2P and a molded photosensitive assembly 3P. The molded photosensitive assembly 3P includes a molded base 31P, an imaging assembly 32P, and a filter element 33P, wherein the molded base 31P is configured to embed a part of the imaging assembly 32P, the filter element 33P is directly attached to an upper surface of the molded base 31P, and the filter element 33P corresponds to a photosensitive path of the imaging assembly 32P. The motor camera lens assembly 2P includes a motor 21P and an optical lens 22P, wherein the optical lens 22P is locked attached to the motor 21P, and the motor 21P is arranged on an upper surface of the molded base 31P of the molded photosensitive assembly 3P, so that the optical lens 22P corresponds to the photosensitive path of the imaging assembly 32P, and the filter element 33P is located between the optical lens 22P and the imaging assembly 32P. In this way, when the motor 21P drives the optical lens 22P to move up and down, the optical lens 22P will move away from or close to the imaging assembly 32P, so as to realize the focusing or focus adjustment of the camera module 1P.

However, although the molded base 31P with a smaller thickness can be manufactured through a molding process, the thickness of the molded photosensitive assembly 3P can be reduced, and thus a distance between the optical lens 22P of the motor camera lens assembly 2P and the imaging assembly 32P of the molded photosensitive assembly 3P can be reduced, but the filter element 33P can usually only be attached to the upper surface of the molded base 31P, so that a distance between the filter element 33P and the optical lens 22P is small. Furthermore, in order to further reduce the height of the conventional camera module 1P, a reasonable optical system design can be used to reduce a back focus of the camera module 1P to a certain extent, so that the distance between the optical lens 22P and the imaging assembly 32P is further reduced, thereby causing the distance between the optical lens 22P and the filter element 33P to become smaller. In this way, during the focusing or focus adjustment process of the camera module 1P, when the optical lens 22P is driven by the motor 21P to approach the imaging assembly 32P, the optical lens 22P can easily collides with the filter element 33P, causing the filter element 33P to break or the optical lens 22P to be damaged, which seriously affects the reliability of the conventional camera module 1P.

In addition, since a bottom surface of the motor of the motor camera lens assembly is usually a flat surface, and a corresponding attachment surface of the motor on the molded base is also a flat surface. In order to place the filter in the camera module with short back focus as far as possible, the corresponding attachment surface of the filter on the molded base is usually sunk as far as possible, but in order to reduce the height of the camera module, the height of the attachment surface of the motor on the molded base also needs to be reduced. Therefore, the attachment surface of the filter on the molded base is usually only slightly lower than the corresponding attachment surface of the motor on the molded base. The height of the filter itself and the thickness of the glue layer will make the upper surface of the filter still higher than the attachment surface of the motor, so there is still a risk of cracking the filter. In other words, no matter the attachment surface of the motor on the molded base is higher than, flush with, or lower than the attachment surface of the filter on the molded base, there is a risk of the filter being impacted by the optical lens. Therefore, a new module structure design is urgently needed to solve the above-mentioned problems.

Referring to FIGS. 2 to 4B, a camera module according to an embodiment of the present invention is illustrated, wherein a camera module 1 includes a blocking-type photosensitive assembly 10 and at least one motor camera lens assembly 20, and the blocking-type photosensitive assembly 10 includes a molded photosensitive assembly 11 and a blocking structure 12. The molded photosensitive assembly 11 includes an imaging assembly 111, a molded base 112, and a filter element 113, wherein the molded base 112 embeds a part of the imaging assembly 111, and the molded base 112 has a light window 1120, and the light window 1120 of the molded base 112 corresponds to a photosensitive path of the imaging assembly 111, and the filter element 113 is correspondingly arranged on the light window 1120 of the molded base 112. Each motor camera lens assembly 20 includes a motor 21 and an optical lens 22, wherein the motor 21 is arranged on the blocking-type photosensitive assembly 10, and the optical lens 22 is drivably arranged on the motor 21, so that the optical lens 22 is driven by the motor 21 to approach or move away from the imaging assembly 111 of the molded photosensitive assembly 11, wherein the optical lens 22 corresponds to the photosensitive path of the imaging assembly 111, and the filter element 113 is located between the imaging assembly 111 and the optical lens 22, so that along the photosensitive path of the imaging assembly 111, external light passes through the optical lens 22 first, then passes through the filter element 113, and finally passes through the light window 1120 of the molded base 112 to reach the imaging assembly 111.

Figure 3:
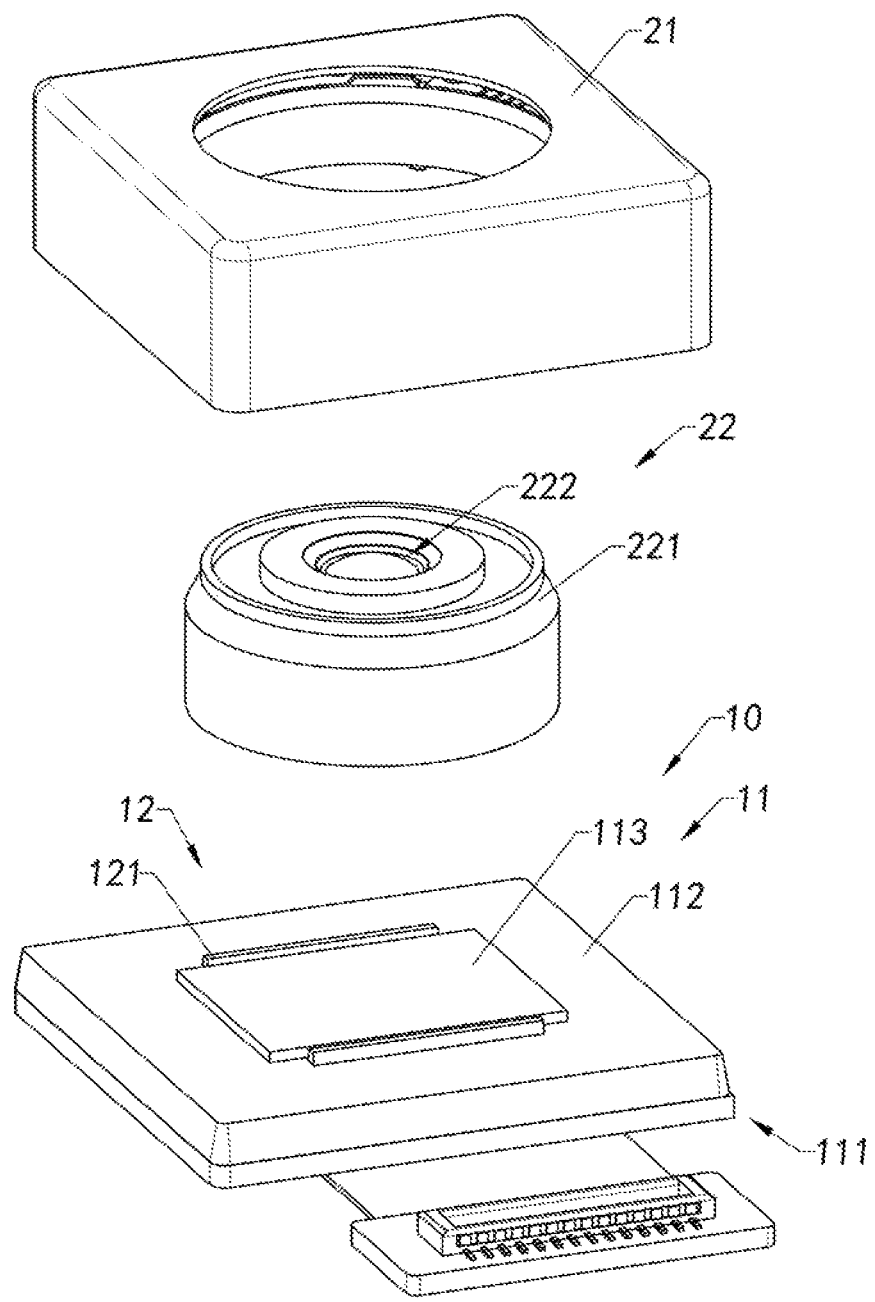
FIG. 3 shows an exploded schematic diagram of the camera module according to the above-mentioned embodiment of the present invention.
Figure 4A:
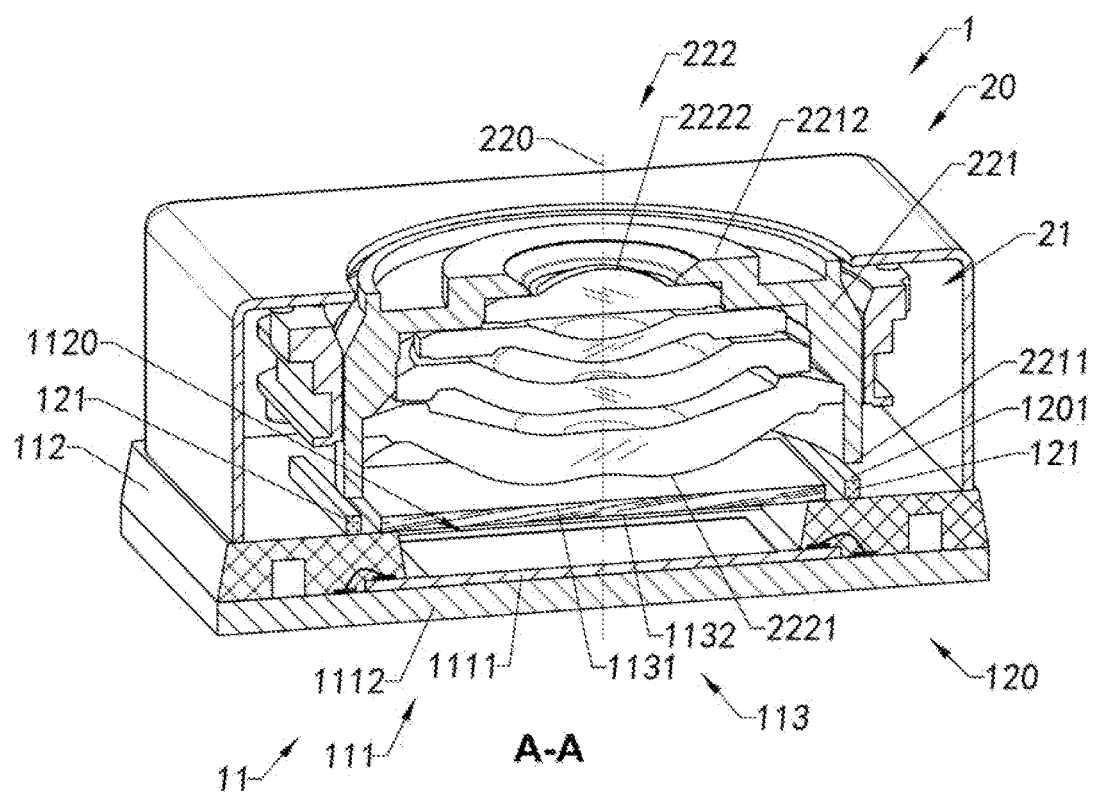
FIG. 4A shows a schematic cross-sectional view of the camera module according to the above-mentioned embodiment of the present invention.
Figure 4B:
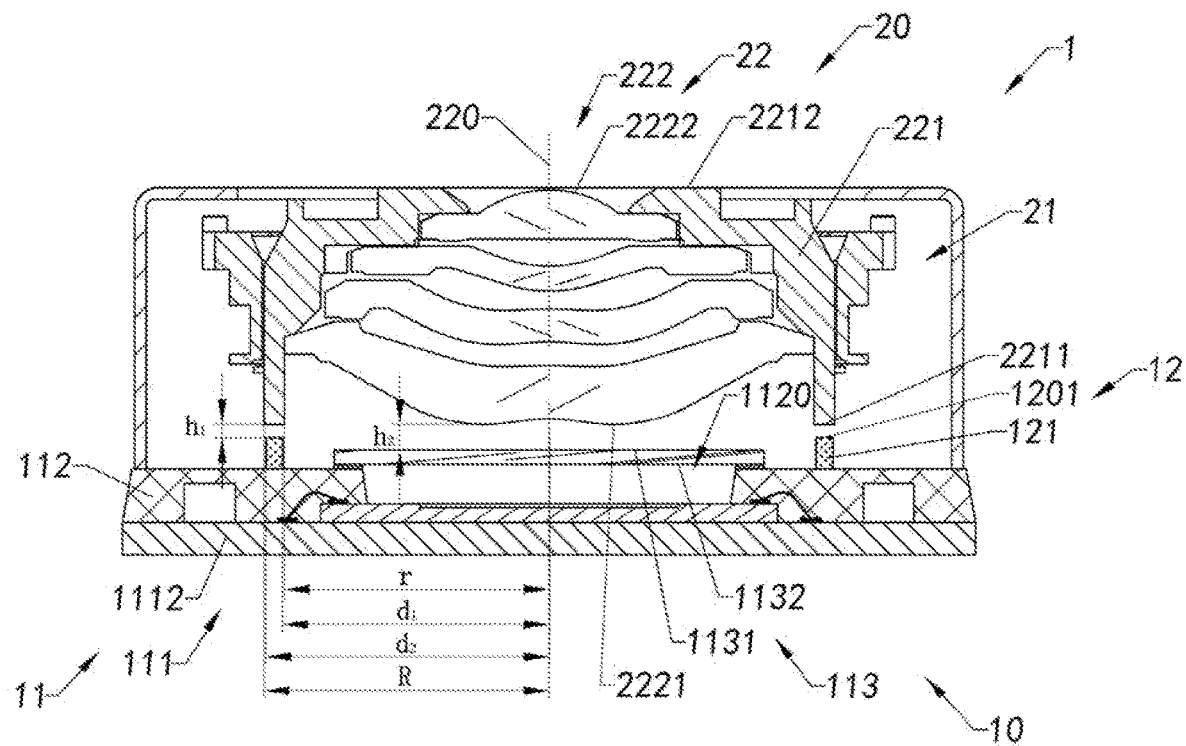
FIG. 4B shows a schematic cross-sectional view of the camera module according to the above-mentioned embodiment of the present invention.

In particular, as shown in FIGS. 3 to 4B, the blocking structure 12 of the blocking-type photosensitive assembly 10 is arranged on the molded photosensitive assembly 11, and a blocking surface 1201 of the blocking structure 12 is higher than an upper surface 1131 of the filter element 113 of the molded photosensitive assembly 11; wherein the blocking surface 1201 of the blocking structure 12 corresponds to the optical lens 22 of the motor camera lens assembly 20, so that when the optical lens 22 is driven by the motor 21 to approach the imaging assembly 111 of the molded photosensitive assembly 11, the blocking structure 12 can prevent the optical lens 22 from directly contacting the filter element 113, so as to prevent collision between the optical lens 22 and the filter element 113, thereby effectively reducing the risk of the filter element 113 to be cracking due to the collision.

In other words, it is just because the blocking surface 1201 of the blocking structure 12 is higher than the upper surface 1131 of the filter element 113, and the blocking surface 1201 of the blocking structure 12 corresponds to the optical lens 22, when the optical lens 22 is driven to approach the imaging assembly 111, the optical lens 22 will first contact the blocking surface of the blocking structure 12 before colliding with the filter element 113, so as to avoid the optical lens 22 from directly impacting the filter element 113 to prevent the filter element 113 from being damaged due to collision, which helps to improve the reliability of the camera module 1.

It is worth noting that in this embodiment of the present invention, as shown in FIG. 4A, the blocking surface 1201 of the blocking structure 12 may be, but is not limited to, implemented as a top surface of the blocking structure 12, so as to block the optical lens 22 by the top surface of the blocking structure 12 to prevent the optical lens 22 from directly contacting the filter element 113. Certainly, in other examples of the present invention, the blocking surface 1201 of the blocking structure 112 may also be implemented as a side wall or other part of the blocking structure 12, as long as it can block the optical lens 22 from contacting the filter element 113, so as to protect the filter element 113 from being impacted by the optical lens 22. Details are not described again in the present invention.

It is worth mentioning that although in FIGS. 2 to 4B and the following description, the camera module 1 including only one motor camera lens assembly 20 is taken as an example to illustrate the features and advantages of the camera module 1 of the present invention, a person skilled in the art could understand that the camera module 1 disclosed in FIGS. 2 to 4B and the following description is only an example, and do not constitute limitations to the content and scope of the present invention. For example, in other examples of the camera module 1, the number of the motor camera lens assembly 20 may also exceed one to form an array camera module.

It is worth noting that in this embodiment of the present invention, as shown in FIG. 4A and FIG. 4B, the imaging assembly 111 of the molded photosensitive assembly 11 may include a photosensitive element 1111 and a circuit board 1112, wherein the photosensitive element 1111 and the circuit board 1112 are conductively connected. It could be understood that a photosensitive region of the photosensitive element 1111 of the imaging assembly 111 corresponds to the light window 1120 of the molded base 112, so that the photosensitive region of the photosensitive element 1111 defines the photosensitive path of the imaging assembly 111, so that the external light first passes through the optical lens 22 and the filter element 113 in sequence, and then passes through the light window 1120 of the molded base 112 to reach the photosensitive region of the photosensitive element 1111, so as to be received by the photosensitive region of the photosensitive element 1111 to form an image.

In addition, in the camera module 1 of the above-mentioned embodiment of the present invention, the molded base 112 of the molded photosensitive assembly 11 of the blocking-type photosensitive assembly 10 may simultaneously embed a part of the photosensitive element 1111 of the imaging assembly 111 and a part of the circuit board 1112, so that the photosensitive element 1111 and the circuit board 1112 are integrated into one body through the molded base 112, so that the imaging assembly 111 forms an integrated structure. Certainly, in other examples of the present invention, the molded base 112 may also embed only a part of the circuit board 1112, and the photosensitive element 1111 is directly attached to the circuit board 1112, the present invention does not limit this further.

Figure 2:
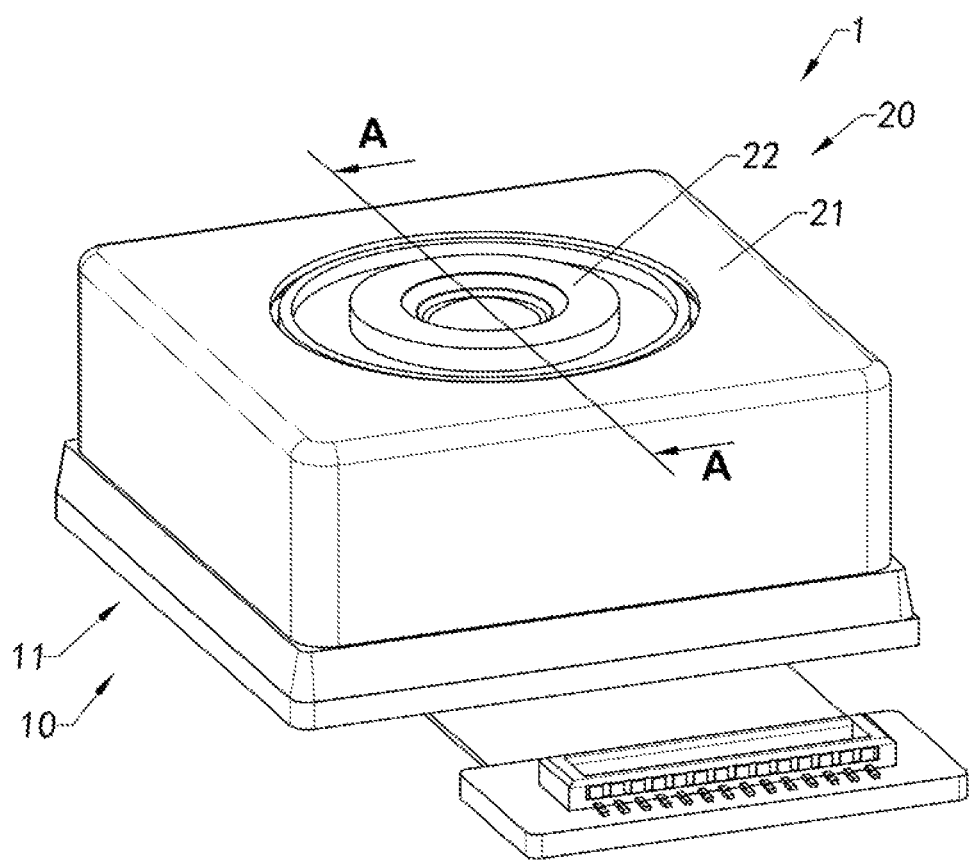
FIG. 2 is a three-dimensional schematic diagram of a camera module according to an embodiment of the present invention.

According to the above-mentioned embodiment of the present invention, as shown in FIG. 2 and FIG. 4A, the optical lens 22 of the motor camera lens assembly 20 of the camera module 1 further includes a lens barrel 221 and a lens group 222, wherein the lens group 222 is assembled to the lens barrel 221, and the lens barrel 221 is movably mounted on the motor 21, so that the lens barrel 221 is driven by the motor 21 to move up and down in the motor 21, so that the optical lens 22 can approach or move far away from the imaging assembly 111 of the molded photosensitive assembly 11 of the blocking-type photosensitive assembly 10 to realize the focusing or focus adjustment function of the camera module 1.

It is worth noting that the blocking-type photosensitive assembly 10 of the present invention is extremely suitable for adapting to the optical lens 22 with short back focus, so as to block the optical lens 22 and the filter element 113 of the molded photosensitive assembly 11 from contacting and colliding. Preferably, the optical lens 22 may be, but is not limited to, implemented such that its back focus is not greater than 0.6 mm (i.e., the back focus of the optical lens 22 is less than or equal to 0.6 mm). Certainly, in other examples of the present invention, the back focus of the optical lens 22 may also be greater than 0.6 mm.

More preferably, as shown in FIG. 4A, the blocking surface 1201 of the blocking structure 12 of the blocking-type photosensitive assembly 10 corresponds to the lens barrel 221 of the optical lens 22 of the motor camera lens assembly 20, so that when the optical lens 22 is driven to approach the imaging assembly 111, the blocking surface 1201 of the blocking structure 12 can contact the lens barrel 221 of the optical lens 22, so that the blocking structure 12 prevents the optical lens 22 from colliding with the filter element 113 by contacting the lens barrel 221, so as to prevent the blocking structure 12 from colliding with the lens group 222 of the optical lens 22, thereby avoiding the lens group 222 to be damaged due to the collision of the blocking structure 12.

It is worth mentioning that in some embodiments of the present invention, as shown in FIG. 4A and FIG. 4B, in order to further reduce the height of the camera module 1, the optical lens 22 of the motor camera lens assembly 20 may also optimize the design of the lens barrel structure to make the lowest point of a light-exit surface 2221 of the lens group 222 flush with a light-exit end surface 2211 of the lens barrel 221, or to protrude the last lens in the lens group 222 from the light-exit end surface 2211 of the lens barrel 221 (i.e., the lowest point of the light-exit surface 2221 of the lens group 222 is lower than the light-exit end surface 2211 of the lens barrel 221), so as to minimize the height of the lens barrel 221 that limits the height of the optical lens 22. It could be understood that a light-incoming surface 2222 of the lens group 222 is opposite to the light-exit surface 2221 of the lens group 222, so that external light first enters from the light-incoming surface 2222 of the lens group 222, and then exits from the light-exit surface 2221 of the lens group 222. Similarly, the light-incoming end surface 2212 of the lens barrel 221 is also opposite to the light-exit end surface 2211 of the lens barrel 221, and the light-incoming end surface 2212 of the lens barrel 221 corresponds to the light-incoming surface 2222 of the lens group 222, and the light-exit end surface 2211 of the lens barrel 221 corresponds to the light-exit surface 2221 of the lens group 222.

However, once the height of the blocking structure 12 is insufficient, this structure of the optical lens 22 may still cause the lens group 222 of the optical lens 22 to collide with the filter element 113. Therefore, in order to ensure the blocking structure 12 can prevent any part of the optical lens 22 from colliding with the filter element 113, in the camera module 1 of the present invention, as shown in FIG. 4B, a distance $h_1$ between the blocking surface 1201 of the blocking structure 12 of the camera module 1 and the light-exit end surface 2211 of the lens barrel 221 is smaller than a shortest distance $h_2$ between the upper surface 1131 of the filter element 113 and the light-exit surface 2221 of the lens group 222 of the optical lens 22 (i.e., $h_1 < h_2$), so that when the blocking surface 1201 of the blocking structure 12 contacts the light-exit end surface 2211 of the lens barrel 221, there is still a gap between the light-exit surface 2221 of the lens group 222 of the optical lens 22 and the upper surface 1131 of the filter element 113, so as to effectively avoid the optical lens 22 from colliding with the filter element 113. It could be understood that, in other examples of the present invention, when the light-exit surface 2221 of the lens group 222 of the optical lens 22 is higher than the light-exit end surface 2211 of the lens barrel 221, the distance between the blocking surface 1201 of the blocking structure 12 and the light-exit end surface 2211 of the lens barrel 221 must be smaller than the distance between the upper surface 1131 of the filter element 113 and the light-exit surface 2221 of the lens group 222 of the optical lens 22.

It is worth mentioning that, in the above-mentioned embodiment of the present invention, as shown in FIG. 4A and FIG. 4B, the filter element 113 of the molded photosensitive assembly 11 of the blocking-type photosensitive assembly 10 of the camera module 1 is mounted on the molded base 112, wherein the blocking structure 12 is correspondingly arranged on a part of the molded base 112 outside the filter element 113, so that the blocking structure 12 does not make any contact with the filter element 113. In this way, when the optical lens 22 contacts or collides with the blocking structure 12, the filter element 113 will not be subjected to any external force from the optical lens 22 or/and the blocking structure 12, so as to protect the filter element 113 from being damaged.

Preferably, as shown in FIG. 4B, the blocking structure 12 of the blocking-type photosensitive assembly 11 extends upward from the surface of the molded base 112, so that the blocking surface 1201 of the blocking structure 12 is higher than the upper surface 1131 of the filter element 113, so as to prevent the optical lens 22 from impacting the filter element 113 through the blocking structure 12. In other words, the blocking structure 12 of the blocking-type photosensitive assembly 11 extends from the surface of the molded base 112 toward the lens barrel 221 of the optical lens 22, so that the blocking surface 1201 of the blocking structure 12 is higher than the upper surface 1131 of the filter element 113, that is, the distance between the blocking surface 1201 of the blocking structure 12 and the light-exit end surface 2211 of the lens barrel 221 is smaller than the distance between the upper surface 1131 of the filter element 113 and the light-exit surface 2221 of the lens group 222 of the optical lens 22, so as to prevent any part of the optical lens 22 from contacting or impacting the filter element 113.

Further, in this embodiment of the present invention, the blocking structure 12 of the blocking-type photosensitive assembly 11 may be, but is not limited to, separately arranged on the molded base 112 by means of adhering, that is, the bottom surface of the blocking structure 12 and the surface of the molded base 112 are adhered by an adhering agent, so that the blocking structure 12 is mounted on the molded base 112 as an independent component. In this way, on the basis of not making any changes to the original structure of the existing camera module, it is only necessary to correspondingly mount the blocking structure 12 on the molded base, and the existing camera module can be converted into the camera module 1, thereby reducing the risk of the filter element being cracked. It could be understood that in other examples of the present invention, the blocking structure 12 can also be mounted on the molded base 112 by means such as snapping, fitting, welding, or screwing, etc., and it is only necessary to ensure the blocking surface 1201 of the blocking structure 12 is higher than the upper surface 1131 of the filter element 113, and the blocking surface 1201 of the blocking structure 12 corresponds to the optical lens 11. Details are not described in the present invention.

More preferably, as shown in FIG. 3 and FIG. 4A, the blocking structure 12 may include at least one strip shaped protrusion member 121, wherein each strip shaped protrusion member 121 is mounted on the molded base 112, and each strip shaped protrusion member 121 extends along the edge of the filter element 113 to form a linear shaped protrusion on the molded base 112, so as to increase a contact area between the blocking structure 12 and the lens barrel 221 of the optical lens 22 to help to reduce the impact strength of the blocking structure 12 on the optical lens 22, thereby helping to protect the optical lens 22.

It is worth mentioning that for most camera modules, the optical lens usually has a circular cross-section, while the filter element usually has a rectangular cross-section, that is, in the camera module 1, the optical lens 22 of the motor camera lens assembly 20 has a circular cross-section, while the filter element 113 of the molded photosensitive assembly 11 has a rectangular cross-section. Therefore, in this embodiment of the present invention, the strip shaped protrusion member 121 of the blocking structure 12 preferably extends along a long edge of the filter element 113, that is, one end of the strip shaped protrusion member 121 extends along the long edge of the filter element 113, so as to form a linear shaped protrusion on the molded base 112, so that an upper side surface of the strip shaped protrusion member 121 serves as the blocking surface 1201 of the blocking structure 12, which facilitates further increasing the contact area between the blocking structure 12 and the optical lens 22.

Exemplarily, as shown in FIG. 3, the blocking structure 12 includes two strip shaped protrusion members 121, wherein the two strip shaped protrusion members 121 are respectively symmetrically arranged outside the two long edges of the filter element 113, and each of the strip shaped protrusion element 121 extends from one short edge of the filter element 113 to the other short edge of the filter element 113 along the long edge of the filter element 113, so that the two strip shaped protrusion elements 121 can contact the optical lens 22 at the same time, which facilitates sharing the collision force between the optical lens 22 and the blocking structure 12, and at the same time reduces the risk of collision between the optical lens 22 and the filter element 113 caused by tilt of the camera lens. Certainly, in other examples of the present invention, the blocking structure 12 may also include only one or more strip shaped protrusion elements 121, for example, a plurality of the strip shaped protrusion members 121 may be arranged at intervals outside the same long edge of the filter element 113, or may be separately arranged outside the long edge and the short edge of the filter element 113. It is only necessary to ensure that the strip shaped protrusion element 121 can correspond to the optical lens 22 to prevent the optical lens 22 from colliding with the filter element 113. Details are not described again in the present invention.

It is worth noting that, in order to ensure that the blocking structure 12 can protect the filter element 113 from collision by blocking the lens barrel 221 of the optical lens 22, that is, the blocking surface 1201 of the blocking structure 12 can correspond to the lens barrel 221 of the optical lens 22. Therefore, as shown in FIG. 4B, the strip shaped protrusion member 121 of the blocking structure 12 of the present invention may be, but is not limited to, implemented as a protrusion having a rectangular cross-section, and a distance $d_1$ between an inner surface of the strip shaped protrusion member 121 and an optical axis 220 of the optical lens 22 is preferably smaller than an outer radius R of the lens barrel 221 of the optical lens 22 (i.e., $d_1$<R). In other words, a distance between the inner edges of the two symmetrically arranged strip shaped protrusion members 121 is smaller than the outer diameter of the lens barrel 221.

Further, as shown in FIG. 4B, a distance $d_2$ between an outer surface of the strip shaped protrusion member 121 of the blocking structure 12 and the optical axis 220 of the optical lens 22 is greater than an inner radius r of the lens barrel 221 of the optical lens 22 (i.e., $d_2$>r), that is to say, the distance between the outer edges of the two strip-shaped protrusion members 121 is greater than the inner diameter of the lens barrel 221, so as to ensure the strip shaped protrusion member 121 of the blocking structure 12 at least corresponds to the lens barrel 221 of the optical lens 22.

Further, in order to ensure that the blocking structure 12 can block the optical lens 22 from impacting the filter element 113 while preventing the blocking structure 12 from contacting or impacting the lens group 222 of the optical lens 22, so as to protect the lens group 222 of the optical lens 22 from collision. Therefore, as shown in FIG. 4B, the distance $d_2$ between the outer side surface of the strip shaped protrusion member 121 of the blocking structure 12 and the optical axis 220 of the optical lens 22 is smaller than the outer radius R of the lens barrel 221 of the optical lens 22 (i.e., $d_2$<R), so that the blocking surface 1201 of the blocking structure 12 will not be exposed outside the light-exit end surface 2211 of the lens barrel 221, so as to reserve enough mounting space for the motor 21 on the molded base 112, and effectively avoid the blocking structure 12 from interfering with the assembly between the motor camera lens assembly 20 and the molded base 112.

More preferably, as shown in FIG. 4B, the distance $d_1$ between the inner side surface of the strip shaped protrusion member 121 of the blocking structure 12 and the optical axis 220 of the optical lens 22 is not smaller than the inner radius r of the lens barrel 221 of the optical lens 22 (i.e., $d_1$≥r), so as to avoid the strip shaped protrusion member 121 from contacting or colliding with the lens group 222.

In addition, in this embodiment of the present invention, in order to alleviate the collision between the blocking structure 12 and the optical lens 22, the strip shaped protrusion member 121 of the blocking structure 12 may be, but is not limited to, made of elastic materials such as rubber, silica gel, or elastic plastic, etc., so that when the optical lens 22 collides with the blocking structure 12, the strip shaped protrusion member 121 can apply a buffering effect through deformation, so as to reduce a collision strength between the blocking structure 12 and the optical lens 22, which facilitates protecting the optical lens 22 and/or the blocking structure 12.

Figure 5A:
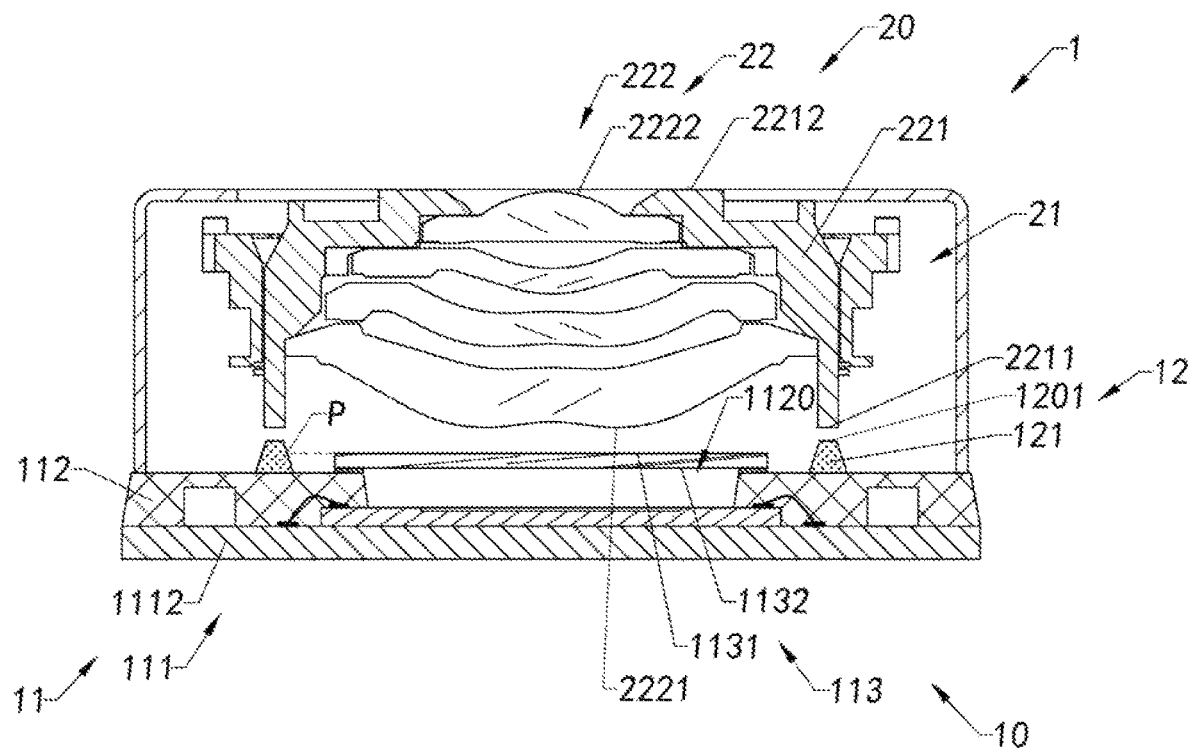
FIGS. 5A and 5B show a first modified implementation mode of the blocking-type photosensitive assembly according to the above-mentioned embodiment of the present invention.
Figure 5B:
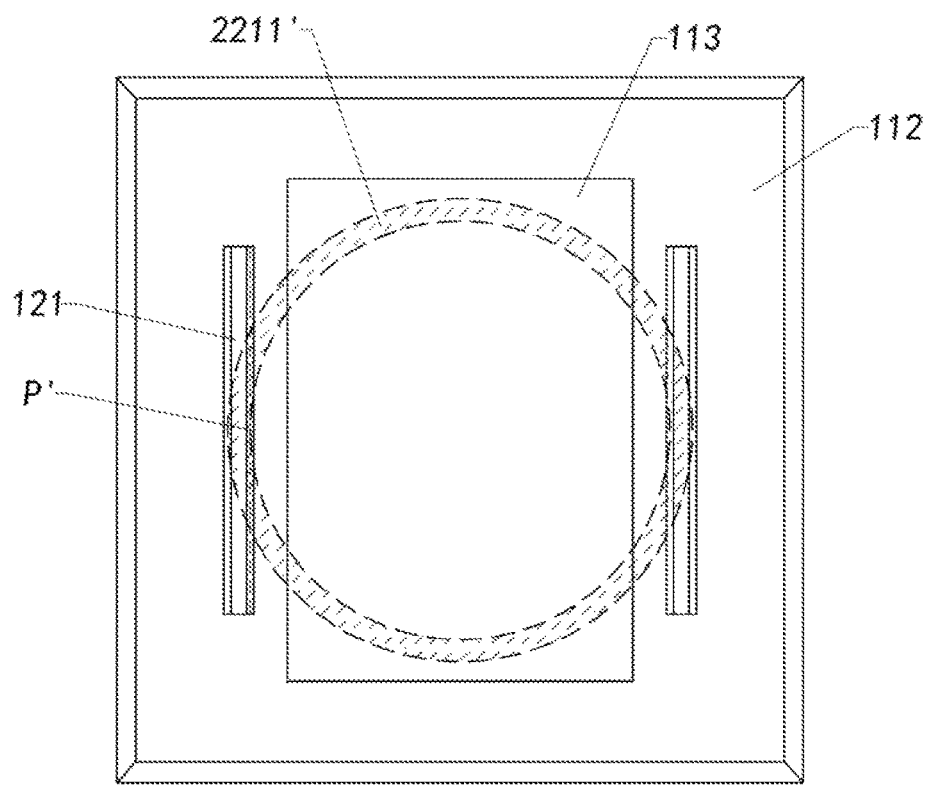

It is worth noting that, FIGS. 5A and 5B show a first modified implementation mode of the blocking-type photosensitive assembly 10 of the camera module 1 according to the above-mentioned embodiment of the present invention, wherein the strip shaped protrusion member 121 of the blocking structure 12 has a trapezoidal cross-section, so that an area of an upper side of the strip shaped protrusion member 121 is smaller than an area of a lower side of the strip shaped protrusion member 121, that is, an area of the blocking surface 1201 of the blocking structure 12 is smaller than an area of a bottom surface of the blocking structure 12, so as to prevent the blocking surface 1201 of the blocking structure 12 from contacting or colliding with the lens group 222 of the optical lens 22, while also providing a large enough bonding area for the strip shaped protrusion member 121 of the blocking structure 12 to firmly bond the strip shaped protrusion member 121 to the molded base 112.

Further, except that the top surface of the strip shaped protrusion member 121 may be implemented as the blocking surface 1201, the side surface of the strip shaped protrusion member 121 that is higher than the upper surface 1131 of the filter element 113 may also be implemented as the blocking surface 1201. Exemplarily, as shown in FIG. 5B, the dotted line shows the projection 2211' of the light-exit end surface 2211 of the lens barrel 221 of the optical lens 22 on the molded photosensitive assembly 11. Therefore, in order to ensure that the blocking surface 1201 can block the optical lens 22 from directly contacting the filter element 113, the projection 2211' of the light-exit end surface 2211 of the lens barrel 221 of the optical lens 22 of the present invention on the molded photosensitive assembly 11 overlaps with the projection of the blocking surface 1201 of the blocking structure 12 on the molded photosensitive assembly 11. In other words, as shown in FIG. 5A, a plane where the upper surface 1131 of the filter element 113 is located and an inner surface of the strip shaped protrusion member 121 of the blocking structure 12 intersect at a line P, so in order to ensure that the blocking surface 1201 can block the optical lens 22 from directly contacting the filter element 113, a straight line where the projection P' of the line P on the molded photosensitive assembly 11 is located must intersect an arc where an outer edge of the projection 2211' of the light-exit end surface 2211 of the lens barrel 221 on the molded photosensitive assembly 11 is located, that is, a vertical distance between a center of the projection P' of the line P and the projection 2211' of the light-exit end surface 2211 must be smaller than an outer diameter of the light-exit end surface 2211 of the lens barrel 221.

Preferably, in order to avoid the blocking surface 1201 of the blocking structure 12 from contacting the lens group 222 of the optical lens 22, the inner edge of the projection of the blocking surface 1201 of the blocking structure 12 on the molded photosensitive assembly 11 of the lens barrel 221 is outside of the inner edge of the projection 2211' of the light-exit end surface 2211 of the lens barrel 221 on the molded photosensitive assembly 11. For example, the straight line where the projection P' of the line P on the molded photosensitive assembly 11 is located does not intersect the arc where the inner edge of the projection 2211' of the light-exit end surface 2211 of the lens barrel 221 on the molded photosensitive assembly 11 is located.

More preferably, the strip shaped protrusion members 121 of the blocking structure 12 are symmetrically arranged outside the long sides of the filter element 113. On one hand, because the motor 21 usually has a square or a square-like cross-section, the circuit board 1112 of the imaging assembly 111 also has a square or a square-like cross-section, and the filter element 113 has a rectangular cross-section similar to the photosensitive element 1111, so the long side of the filter element 113 has a larger space for arranging the blocking structure 12; on the other hand, since the light-exit end surface 2211 of the lens barrel 221 of the optical lens 22 is generally circular, and the filter element 113 has a rectangular structure, so that the light-exit end surface 2211 of the lens barrel 221 is located directly above the short side of the filter element 113, if the strip shaped protrusion member 121 of the blocking structure 12 is arranged outside the short side of the filter element 113, it is difficult to block the optical lens 22. Therefore, the strip shaped protrusion member 121 of the blocking structure 12 is suitable to be arranged outside the long side of the filter element 113, so that when the optical lens 22 is tilted or when focusing and zooming are performed, the strip shaped protrusion member 121 of the blocking structure 12 can effectively block the optical lens 22 from colliding with the filter element 113.

It is worth mentioning that in other examples of the present invention, the blocking structure 12 may also be implemented as a protrusion member having a cross-section such as an inverted L-shaped cross-section, etc., so that the top surface of the blocking structure 12 is larger than the bottom surface of the blocking structure 12, that is, the blocking surface 1201 of the blocking structure 12 is larger than the bottom surface of the blocking structure 12, so as to provide a larger mounting space for the filter element 113 inside the blocking structure 12, which helps to improve a mounting strength of the filter element 113. Certainly, in other examples of the present invention, the strip shaped protrusion member 121 may also have a cross-section of other shapes such as a semicircle, a trapezoid or a triangle with rounded corners, as long as it can block the optical lens 22 from colliding with the optical lens 22, the present invention does not limit this further.

Figure 6A:
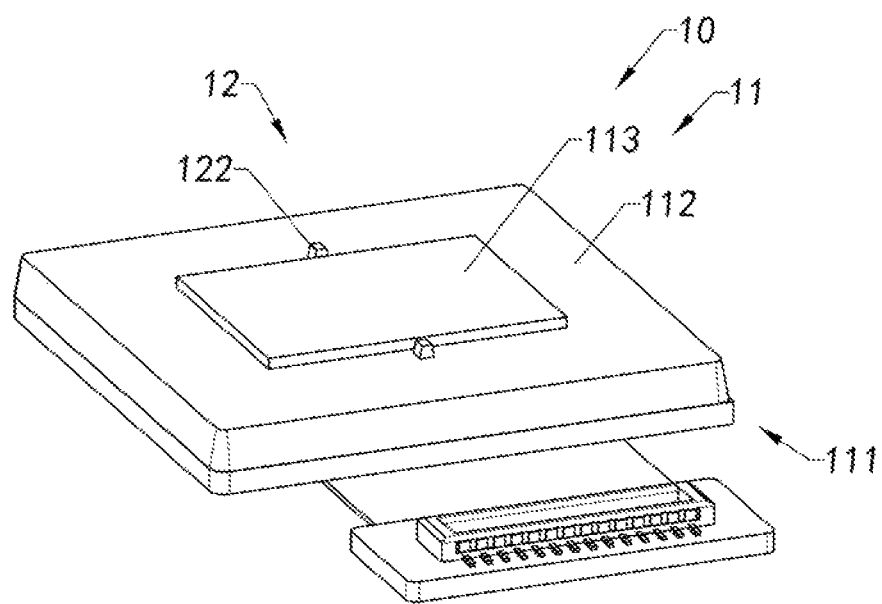
FIG. 6A shows a second modified implementation mode of the blocking-type photosensitive assembly according to the above-mentioned embodiment of the present invention.

FIG. 6A shows a second modified implementation mode of the blocking-type photosensitive assembly 10 of the camera module 1 according to the above-mentioned embodiment of the present invention, wherein the blocking structure 12 only includes at least one column shaped protrusion member 122, wherein each column shaped protrusion member 122 extends upward from the surface of the molded base 112 to form a point shaped protrusion on the molded base 112, that is, one end of the column shaped protrusion member 122 is connected to the surface of the molded base 112, and the other end of the column shaped protrusion member 122 extends in a direction away from the molded base 112 (i.e., approaching the lens barrel 221 of the optical lens 22), so that the other end of the column shaped protrusion member 122 is higher than the upper surface 1131 of the filter element 113, that is to say, the end surface of the other end of the column shaped protrusion member 122 serves as the blocking surface 1201 of the blocking structure 12, so as to ensure that the blocking surface 1201 of the blocking structure 12 is higher than the upper surface 1131 of the filter element 113, so that the column shaped protrusion member 122 can block the collision between the optical lens 22 and the filter element 113.

In this way, although a contact area between the column shaped protrusion member 122 and the optical lens 22 becomes smaller relative to the strip shaped protrusion member 121, which is not conducive to reducing a collision strength between the column shaped protrusion member 122 and the optical lens 22, but an effective utilization area of the column shaped protrusion 122 per unit weight can be greatly increased, which helps to reduce the weight of the blocking structure 12, thereby reducing the overall weight of the camera module 1, and can reduce the possibility of interference between the blocking structure 12 and other structures in the camera module 1. In other words, since the optical lens 22 has a circular cross-section and the filter element 113 has a rectangular cross-section, only a part of the side surface of the strip shaped protrusion member 121 extending along the edge of the filter element 113 can correspond to the lens barrel 221 of the optical lens 22, and other parts of the side surface of the strip shaped protrusion member 121 cannot contact the lens barrel 221, resulting in a reduction in an effective utilization area of the strip shaped protrusion member 121 per unit weight. The column shaped protrusion member 122 can be distributed in a reasonable position, so that the end surface of the column shaped protrusion member 122 completely corresponds to the lens barrel 221 of the optical lens 22, so that the effective utilization area of the column shaped protrusion member 122 per unit weight is much larger that of the strip shaped protrusion member 121.

Exemplarily, in this modified implementation mode of the present invention, as shown in FIG. 6A, the blocking structure 12 may include two column shaped protrusion members 122, wherein the two column shaped protrusion members 122 are respectively symmetrically arranged outside the two long edges of the filter element 113, and the column shaped protrusion member 122 corresponds to the center of the long edge of the filter element 113, so as to ensure that the column shaped protrusion member 122 can completely correspond to the lens barrel 221 of the optical lens 22. Certainly, in other examples of the present invention, the blocking structure 12 may also include four column shaped protrusion members 122, and each column shaped protrusion member 122 corresponds to the center position of the edge of the filter element 113 respectively. It could be understood that the number of the column shaped protrusion members 122 in the blocking structure 12 can be any number, and the position of the column shaped protrusion member 122 can also be arranged at any position on the molded base 112, as long as it is ensured that the column shaped protrusion member 122 can block the optical lens 22 from colliding with the filter element 113. Details are not described in the present invention.

It is worth noting that since the contact area between the column shaped protrusion member 122 and the optical lens 22 becomes smaller, in order to alleviate a collision force between the column shaped protrusion member 122 and the optical lens 22, the column shaped protrusion member 122 of the present invention may be, but is not limited to, made of elastic materials such as rubber, etc. Certainly, in other examples of the present invention, the column shaped protrusion member 122 of the blocking structure 12 can also be implemented as an elastic element having an elastic structure such as a spring, etc., so as to block the optical lens 22 from colliding with the filter element 113, while also alleviating the impact force between the optical lens 22 and the blocking structure 12 when blocking the collision.

Figure 6B:
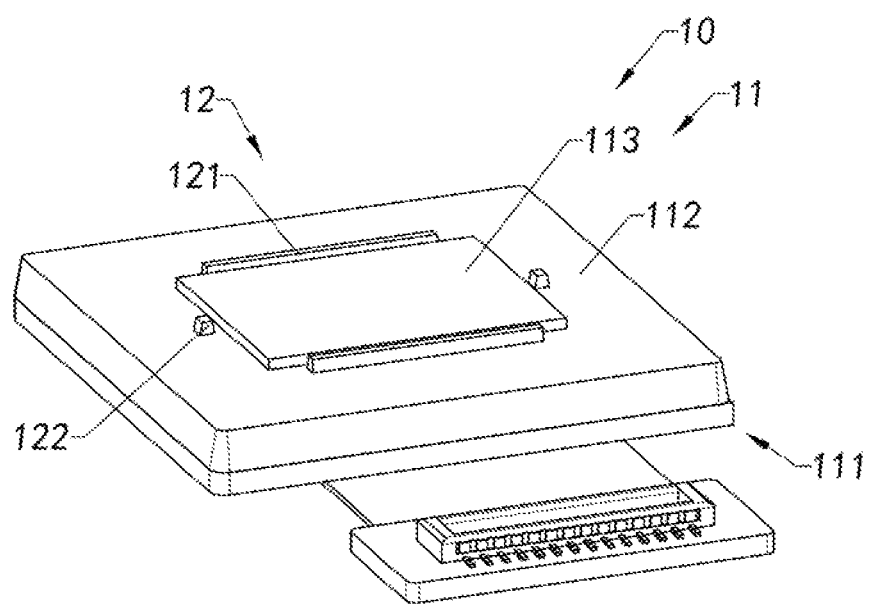
FIG. 6B shows a third modified implementation mode of the blocking-type photosensitive assembly according to the above-mentioned embodiment of the present invention.

FIG. 6B shows a third modified implementation mode of the blocking-type photosensitive assembly 10 of the camera module 1 according to the above-mentioned embodiment of the present invention, wherein the blocking structure 12 includes two strip shaped protrusion members 121 and two column shaped protrusion members 122, wherein the strip shaped protrusion members 121 are symmetrically arranged outside the long edge of the filter element 113 and extend along the long edge of the filter element 113, so as to form linear shaped protrusions on the molded base 112; wherein the column shaped protrusion members 122 are symmetrically arranged outside the short edge of the filter element 113 and respectively correspond to the center of the short edge of the filter element 113, so as to form point shaped protrusions on the molded base 112, so that the blocking structure 12 can combine the advantages of the strip shaped protrusion members 121 (such as linear shaped protrusions) and the column shaped protrusion members 122 (such as point shaped protrusions) to further stably block the collision between the optical lens 22 and the filter element 113.

Figure 7A:
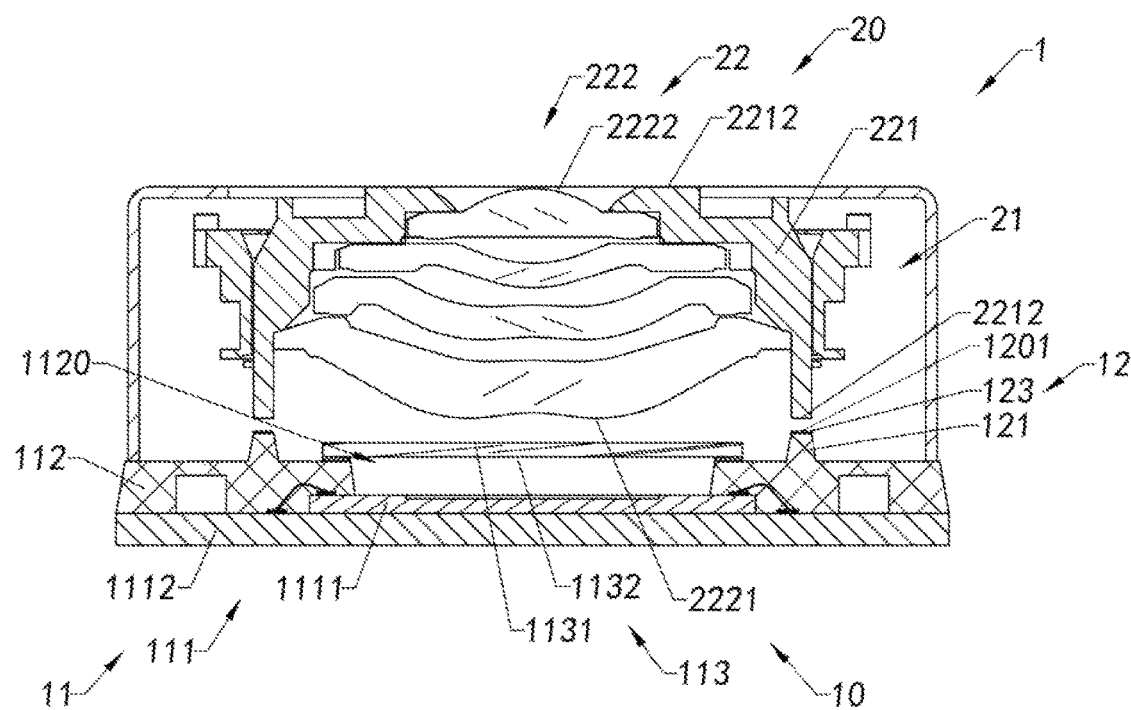
FIG. 7A shows a first modified implementation mode of the camera module according to the above-mentioned embodiment of the present invention.

FIG. 7A shows a first modified implementation mode of the camera module 1 according to the above-mentioned embodiment of the present invention. Compared with the above-mentioned embodiment according to the present invention, the difference of the camera module 1 according to this modified embodiment of the present invention is that the blocking structure 12 of the blocking-type photosensitive assembly 10 is integrally provided on the molded base 112 of the molded photosensitive assembly 11, that is, the blocking structure 12 and the molded base 112 are integrally formed by molding, which not only makes the blocking structure 12 and the module base 112 firmly connected, and helps to simplify the assembly process of the blocking-type photosensitive assembly 10. In this way, after the blocking-type photosensitive assembly 10 is assembled, the motor 21 of the assembled motor camera lens assembly 20 is directly mounted on the molded base 112 to complete the assembly operation of the camera module 1.

Exemplarily, as shown in FIG. 7A, the strip shaped protrusion member 121 of the blocking structure 12 integrally extends upward from the molded base 112 to integrally form a linear shaped protrusion on the surface of the molded base 112, and the strip shaped protrusion member 121 corresponds to the optical lens 22, so that the strip shaped protrusion member 121 effectively blocks the optical lens 22 from colliding with the filter element 113. Certainly, in other examples of the present invention, the blocking structure 12 may further include the column shaped protrusion member 122, wherein the column shaped protrusion member 122 integrally extends upward from the molded base 112 to integrally form a point shaped protrusion on the surface of the molded base 112, which can also block the optical lens 22 from colliding with the filter element 113. It can be understood that when the blocking structure is integrally formed on the molded base 112 by a molding process, the blocking structure is preferably implemented as a strip shaped protrusion member, this is because that the molding material will become a fluid after being heated, when the fluid fills the mold, the elongated structure is easier to form, and it is easier to fill the cavity of the corresponding elongated mold.

It is worth noting that in this modified implementation mode of the present invention, the strip shaped protrusion member 121 of the blocking structure 12 preferably has an isosceles trapezoidal cross-section, so that the area of the upper side of the strip-shaped protrusion member 121 is smaller than the area of the lower side of the strip-shaped protrusion member 121, so as to facilitate a drafting operation during the molding process. In other words, an inner side surface of the strip shaped protrusion member 121 extends outwardly and obliquely from bottom to top, and an outer side surface of the strip shaped protrusion member 121 extends inwardly and obliquely from bottom to top, so that a certain draft angle is reserved on both the inner and outer sides of the strip shaped protrusion member 121 to facilitate the drafting operation after molding. Certainly, in other examples of the present invention, the strip shaped protrusion member 121 may also have a cross-section of other shapes such as a rectangle, a right-angled trapezoid, a triangle, a semicircle, or a convex shape, etc., as long as no negative angle is formed on the inner and outer sides of the strip shaped protrusion member 121.

It is worth mentioning that the molding material usually has a relatively strong hardness after molding, so that the strip shaped protrusion member 121 (or the column shaped protrusion member 122) of the blocking structure 12 made by molding lack elasticity, which causes the strip shaped protrusion member 121 of the blocking structure 12 to generate a relatively large impact force when colliding with the optical lens 22, and thus the optical lens 22 is easily damaged. Therefore, in order to alleviate the impact between the strip shaped protrusion member 121 of the blocking structure 12 and the optical lens 22, as shown in FIG. 7A, the blocking structure 12 of the present invention may further include a buffer layer 123, wherein the buffer layer 123 is made of elastic materials such as plastic, silica gel, etc., and the buffer layer 123 is arranged on the upper side of the strip-shaped protrusion member 121, so that when the blocking structure 12 collides with the optical lens 22, the buffer layer 123 is located between the strip shaped protrusion member 121 and the optical lens 22, and the collision between the blocking structure 12 and the optical lens 22 can be alleviated by the elastic deformation of the buffer layer 123, thereby reducing the collision strength between the blocking structure 12 and the optical lens 22, and helps to protect the optical lens 22 and the strip shaped protrusion member 121. In other words, the buffer layer 123 of the blocking structure 12 is arranged on the upper side of the strip shaped protrusion member 121, so that an upper surface of the buffer layer 123 provides the blocking surface 1201 of the blocking structure 12, so that the blocking structure 12 not only has the function of preventing the optical lens 22 from colliding with the filter element 113, but also can apply a buffering role between the optical lens 22 and the strip shaped protrusion member 121 of the blocking structure 12.

Certainly, in other examples of the present invention, the buffer layer 123 of the blocking structure 12 may also be arranged on the light-exit end surface 2211 of the lens barrel 221 of the optical lens 22, so that when the blocking structure 12 collides with the optical lens 22, the buffer layer 123 is still between the strip shaped protrusion member 121 and the lens barrel 221 of the optical lens 22, which can also reduce the impact strength between the blocking structure 12 and the optical lens 22.

Figure 7B:
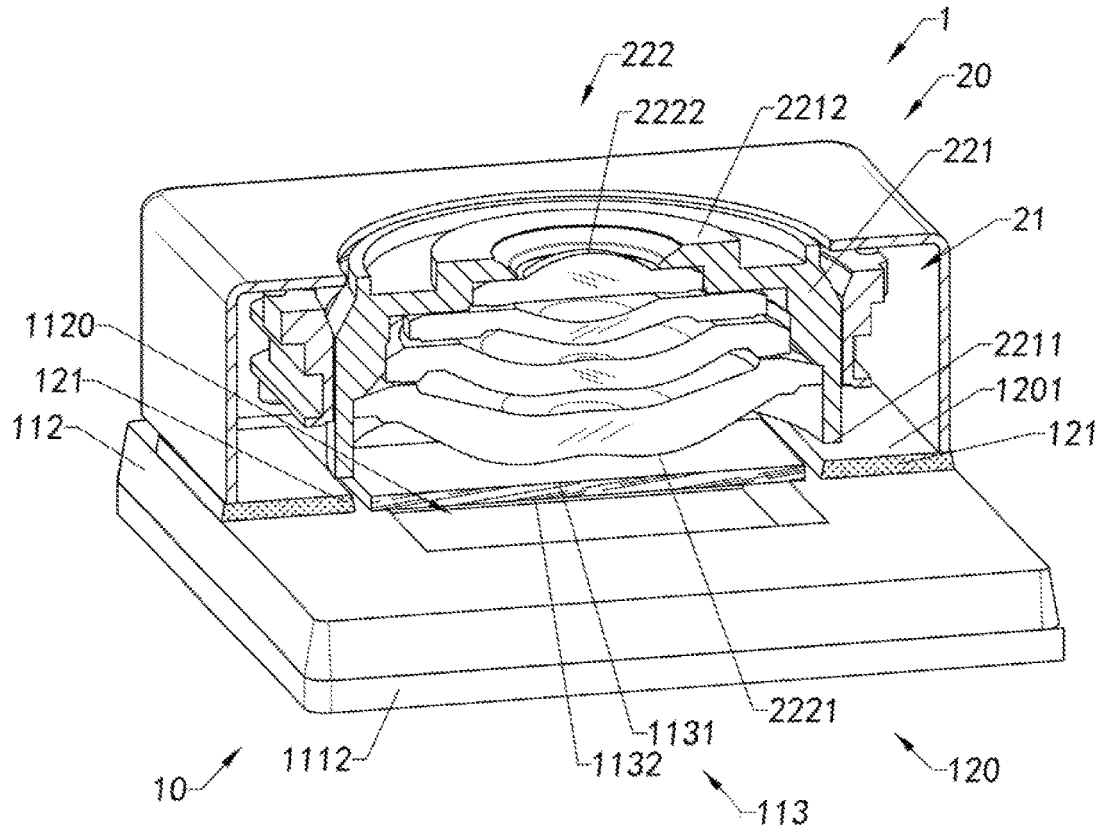
FIG. 7B shows a second modified implementation mode of the camera module according to the above-mentioned embodiment of the present invention.

FIG. 7B shows a second modified implementation mode of the camera module 1 according to the above-mentioned embodiment of the present invention. Compared with the first modified implementation mode according to the present invention, the difference of the camera module 1 according to the second modified implementation mode of the present invention is that the motor 21 of the motor camera lens assembly 20 is directly mounted on the blocking surface 1201 of the blocking structure 12 of the blocking-type photosensitive assembly 10, that is, the motor 21 is directly mounted on the upper surface of the strip shaped protrusion member 121 of the blocking structure 12, so that the blocking structure 12 can prevent the optical lens 22 from colliding with the filter element 113, while also providing a mounting base for the motor 21 of the motor camera lens assembly 20. In other words, the distance between the outer side surface of the strip shaped protrusion member 121 of the blocking structure 12 and the optical axis 220 of the optical lens 22 is greater than the outer radius of the lens barrel 221 of the optical lens 22, so that a part of the blocking surface 1201 of the blocking structure 12 is exposed outside of the light-exit end surface 2211 of the lens barrel 221 for mounting the motor 21.

Figure 7C:
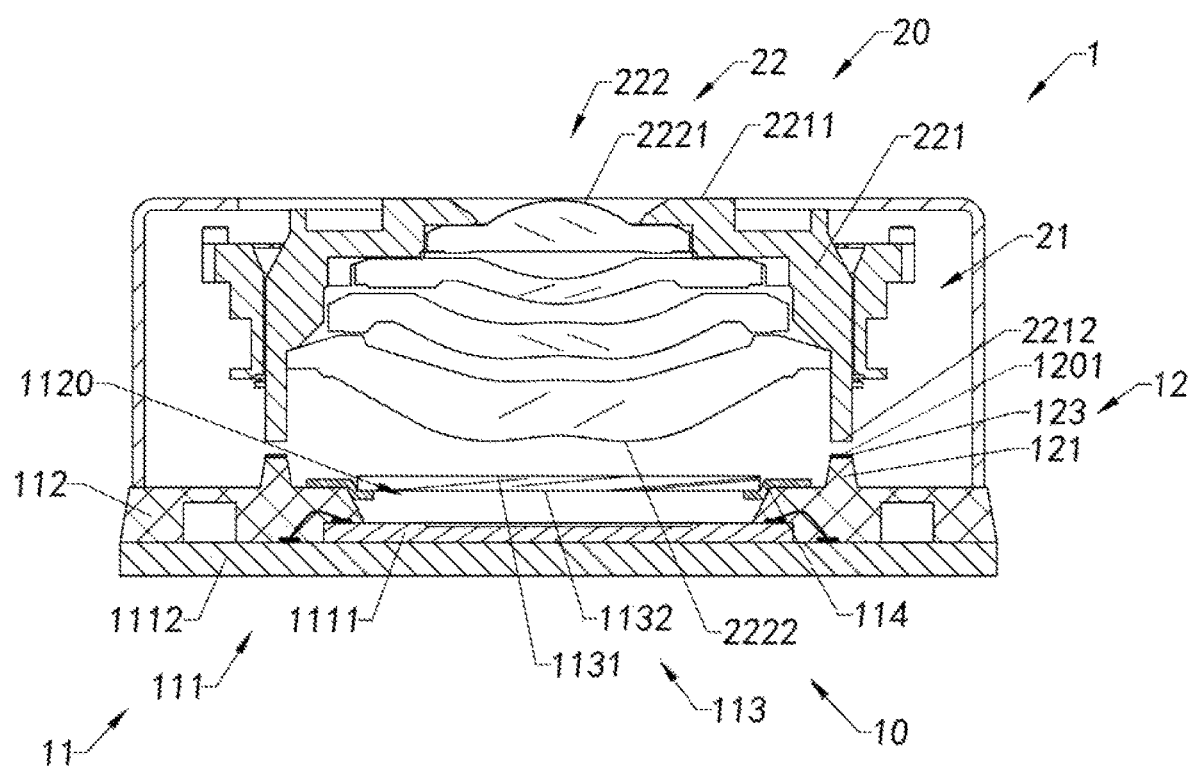
FIG. 7C shows a third modified implementation mode of the camera module according to the above-mentioned embodiment of the present invention.

FIG. 7C shows a third modified implementation mode of the camera module 1 according to the above-mentioned embodiment of the present invention. Compared with the above-mentioned first modified implementation mode according to the present invention, the difference of the camera module 1 according to the third modified implementation of the present invention is that the molded photosensitive assembly 11 of the blocking-type photosensitive assembly 10 may further include a mounting bracket 114, wherein the mounting bracket 114 is arranged on the molded base 112, and the filter element 113 is correspondingly mounted on the mounting bracket 114, so that the filter element 113 is located at the light window 1120 of the molded base 112. It could be understood that under the action of the mounting bracket 114, the filter element 113 having a size smaller than the light window 1120 can be correspondingly arranged on the light window 1120 of the molded base 112. In addition, the blocking-type photosensitive assembly 10 can also mount the filter element 113 at a position below the surface of the molded base 112 through the mounting bracket 114, which helps to reduce the distance between the upper surface 1131 of the filter element 113 and the imaging assembly 111, so that the height of the blocking structure 12 can be reduced, which facilitates the further reduction of the height of the camera module 1.

Figure 7D:
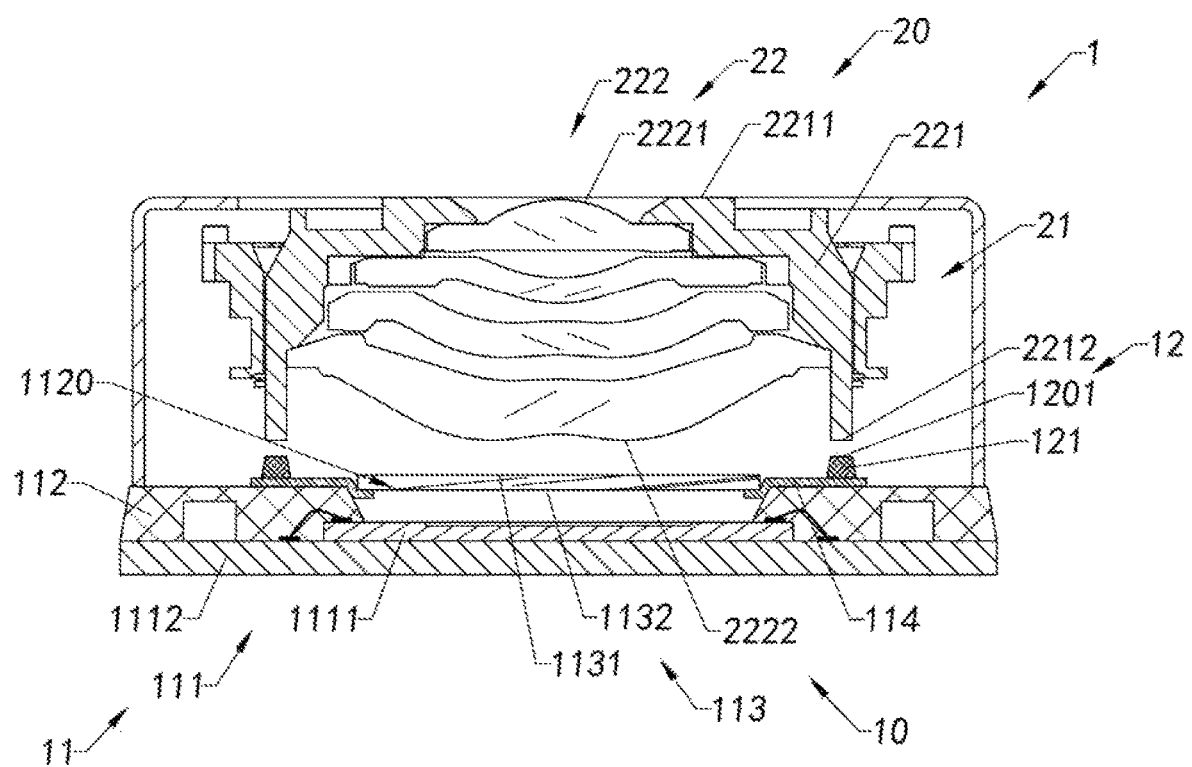
FIG. 7D shows a fourth modified implementation mode of the camera module according to the above-mentioned embodiment of the present invention.

FIG. 7D shows a fourth modified implementation mode of the camera module 1 according to the above-mentioned embodiment of the present invention. Compared with the above-mentioned third modified implementation mode according to the present invention, the difference of the camera module 1 according to the fourth modified implementation mode of the present invention is that the blocking structure 12 of the blocking-type photosensitive assembly 10 is arranged on the mounting bracket 114 of the molded photosensitive assembly 11, so that the mounting bracket 114 is combined with the blocking structure 12 to form a blocking-type mounting bracket, which helps to further reduce the height of the blocking structure 12. In addition, because the blocking structure 12 is directly arranged on the mounting bracket 114, an area on the molded base 112 for mounting the mounting bracket 114 becomes larger, so the mounting bracket 114 can be more firmly mounted on the molded base 112 to improve an internal structural strength of the camera module 1.

Exemplarily, in this modified implementation mode of the present invention, as shown in FIG. 7D, the blocking structure 12 includes two strip shaped protrusion members 121, wherein the strip shaped protrusion members 121 are integrally formed on the mounting bracket 114, and the strip shaped protrusion members 121 are respectively located on opposite sides of the filter element 113, so that the blocking structure 12 and the mounting bracket 114 form a blocking-type mounting bracket with an integrated structure, which facilitates blocking the optical lens 22 from colliding with the filter element 113. In this way, there is no need to make large-scale adjustments to the structure of the conventional camera module, and only need to replace a conventional mounting bracket with the mounting bracket 114 with the blocking structure 12, so that the conventional camera module can be reformed into the camera module 1, which helps to reduce the cost of reforming the camera module. Certainly, in other examples of the present invention, the strip shaped protrusion member 121 of the blocking structure 12 may also be adhered to the mounting bracket 114, so that the blocking structure 12 and the mounting bracket 114 form a blocking-type mounting bracket with a separated structure, in this way, there is no need to replace any existing structure of the conventional camera module, and only need to arrange the blocking structure 12 on the mounting bracket of the conventional camera module to further reduce the cost of reforming the camera module.

In addition, in other embodiments of the present invention, the motor 21 of the motor camera lens assembly 20 may also be directly mounted on the mounting bracket 114 of the molded photosensitive assembly 11 to maximize the mounting area between the mounting bracket 114 and the molded base 112, thereby making the mounting bracket 114 and the molded base 112 more firmly connected.

FIG. 7E shows a fifth modified implementation mode of the camera module 1 according to the above-mentioned embodiment of the present invention. Compared with the above-mentioned embodiment according to the present invention, the difference of the camera module 1 according to the fifth modified implementation mode of the present invention is that the blocking structure 12 of the blocking-type photosensitive assembly 10 is directly mounted in an edge region 1133 of the filter element 113 of the molded photosensitive assembly 11, wherein the blocking structure 12 is made of elastic materials such as silica gel, rubber, etc., so that the elastic deformation of the blocking structure 12 can alleviate the impact of the optical lens 22 on the filter element 113 to reduce the risk of the filter element 113 cracking. It could be understood that the filter element 113 generally includes the edge region 1133 and a filter region 1134, wherein the edge region 1133 is located on periphery of the filter region 1134, and the edge region 1133 of the filter element 113 may be directly attached to the molded base 112 to mount the filter element 113 on the molded base 112, so that the filter region 1134 of the filter element 113 corresponds to the light window 1120 of the molded base 112.

Exemplarily, as shown in FIG. 7E, the blocking structure 12 includes two elastic strip shaped protrusion members 121, wherein the strip shaped protrusion members 121 respectively extend along the long edges of the filter element 113, so as to form linear shaped protrusions on the edge region of the filter element 113 for buffering between the filter element 113 and the optical lens 22 to prevent the filter element 113 from being cracked or smashed. In this way, since the blocking structure 12 is directly above the filter element 113, the blocking structure 12 is always located between the filter element 113 and the optical lens 22, so the blocking structure 12 can apply a better anti-collision effect at a very small height. In particular, the blocking structure 12 can be, but is not limited to, implemented as a silica gel layer attached to the edge region 1133 of the filter element 113 to maximize the buffering capacity of the blocking structure 12.

It is worth noting that in other embodiments of the present invention, the blocking structure 12 may also be correspondingly arranged on the lens barrel 221, and the blocking structure 12 corresponds to the mold base 112 of the molded photosensitive assembly 11, so that when the optical lens 22 is driven to approach the imaging assembly 111, the blocking structure 12 first contacts the mold base 112 before the optical lens 22 contacts the filter element 113, so as to block the optical lens 22 from impacting the filter element 113, thereby effectively reducing the risk of the filter element 113 being cracked or smashed.

According to another aspect of the present invention, an embodiment of the present invention further provides a method for manufacturing a camera module. Specifically, as shown in FIG. 8, the method for manufacturing the camera module includes the steps:

S110: Correspondingly arranging a blocking structure 12 on a molded photosensitive assembly 11 to form a blocking-type photosensitive assembly 10, wherein a blocking surface 1201 of the blocking structure 12 is higher than an upper surface 1131 of a filter element 113 of the molded photosensitive assembly 11; and S120: Correspondingly arranging at least one motor camera lens assembly 20 on the blocking-type photosensitive assembly 10, so that the blocking surface 1201 of the blocking structure 12 corresponds to an optical lens 22 of the motor camera lens assembly 20, wherein when the optical lens 22 can be driven by a motor 21 of the motor camera lens assembly 20 to approach an imaging assembly 111 of the molded photosensitive assembly 11, the blocking structure 12 can prevent the optical lens 22 from directly contacting the filter element 113.

It is worth noting that in the step S110 of an example of the present invention, the blocking structure 12 may be directly adhered to a molded base 112 of the molded photosensitive assembly 11 to separately mount the blocking structure 12 on the molded base 112.

Certainly, in another example of the present invention, the blocking structure 12 may also be integrally formed on the molded base 112 of the molded photosensitive assembly 11 to integrally mount the blocking structure 12 on the molded base 112.

Figure 9:
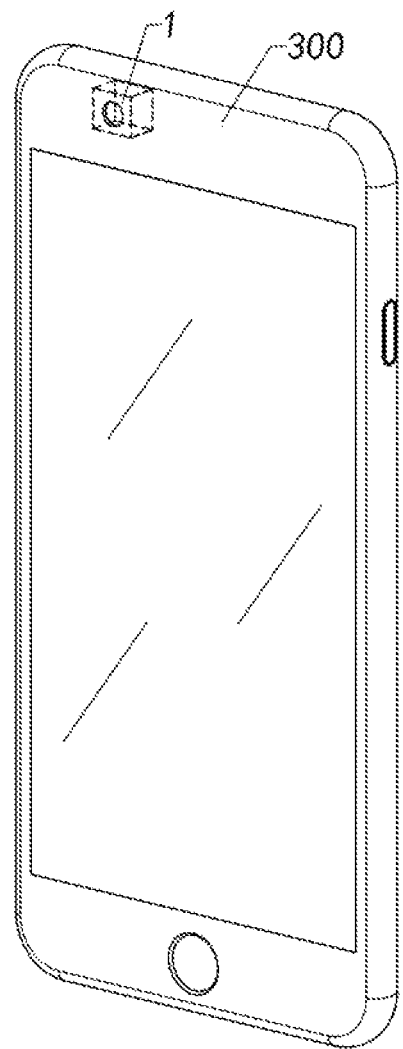
FIG. 9 shows an example of an electronic device configured with the camera module according to the embodiment of the present invention.

Referring to FIG. 9, according to another aspect of the present invention, the present invention further provides an electronic device configured with the camera module according to the above-mentioned embodiment of the present invention, wherein the electronic device includes an electronic device body 300 and at least one camera module 1, and each camera module 1 is respectively arranged on the electronic device body 300 for acquiring images. It is worth mentioning that the type of the electronic device body 300 is not limited. For example, the electronic device body 300 may be any electronic device that can be configured with the camera module 1, such as a smart phone, a tablet computer, a notebook computer, an e-book, a personal digital assistant, a camera, etc. A person skilled in the art can understand that, although the electronic device body 300 is implemented as a smart phone in FIG. 8 as an example, it does not constitute a limitation to the content and scope of the present invention.

A person skilled in the art should understand that the above descriptions and the embodiments of the present invention shown in the accompanying drawings are only examples and do not limit the present invention. The objects of the present invention are completely and effectively achieved. The functions and structural principles of the present invention are shown and explained in the embodiments, and the implementation modes of the present invention may have any variation or modification without departing from the principles.

The invention claimed is:

1. A camera module, characterized by comprising:
    a blocking-type photosensitive assembly, wherein the blocking-type photosensitive assembly includes:
        a molded photosensitive assembly, wherein the molded photosensitive assembly includes:
            an imaging assembly;
            a molded base, wherein the molded base embeds a part of the imaging assembly, and the molded base has a light window, and the light window corresponds to a photosensitive path of the imaging assembly; and
            a filter element, wherein the filter element is correspondingly arranged on the light window of the molded base; and
        a blocking structure, wherein the blocking structure is arranged on the molded photosensitive assembly, and the blocking structure has a blocking surface; and
    at least one motor camera lens assembly, wherein each motor camera lens assembly includes:
        a motor, wherein the motor is arranged on the blocking-type photosensitive assembly; and
        an optical lens, wherein the optical lens is drivably arranged on the motor, and the optical lens corresponds to the photosensitive path of the imaging assembly,
    wherein the blocking surface of the blocking structure is higher than an upper surface of the filter element, and at least a part of the projection of the blocking surface of the blocking structure on the molded photosensitive assembly overlaps with the projection of the optical lens on the molded photosensitive assembly.

2. The camera module of claim 1, wherein the optical lens includes a lens barrel and a lens group, and the lens group is assembled to the lens barrel, and the lens barrel is movably mounted on the motor, and the blocking surface of the blocking structure corresponds to a light-exit end surface of the lens barrel, so that the blocking surface of the blocking structure can directly contact the light-exit end surface of the lens barrel to block the optical lens from directly contacting the filter element.

3. The camera module of claim 2, wherein a distance between the blocking surface of the blocking structure and the light-exit end surface of the lens barrel is smaller than the shortest distance between the upper surface of the filter element and the light-exit surface of the lens group.

4. The camera module of claim 3, wherein the blocking structure is correspondingly arranged on the molded base so as to extend from the molded base toward the lens barrel of the optical lens.

5. The camera module of claim 4, wherein the blocking structure is adhered to the molded base or integrally formed on the molded base to form a protrusion on a surface of the molded base.

6. The camera module of claim 3, wherein the blocking structure is correspondingly arranged at an edge region of the filter element.

7. The camera module of claim 3, wherein the molded photosensitive assembly further includes a mounting bracket, and the mounting bracket is arranged on the molded base, and the filter element is correspondingly mounted on the mounting bracket, and the blocking structure is correspondingly arranged on the mounting bracket, so that the mounting bracket and the blocking structure are combined to form a blocking mounting bracket.

8. The camera module of claim 7, wherein the blocking structure is integrally formed on the mounting bracket to form a protrusion on the mounting bracket.

9. The camera module according to claim 2, wherein the blocking structure includes at least one strip shaped protrusion member, and each strip shaped protrusion member extends along the edge of the filter element to form a linear shaped protrusion, and an upper side surface of the strip shaped protrusion member serves as the blocking surface of the blocking structure.

10. The camera module of claim 9, wherein a back focus of the optical lens is not greater than 0.6 mm.

11. The camera module according to claim 9, wherein at least a part of the projection of the light-exit end surface of the lens barrel of the optical lens on the molded photosensitive assembly overlaps with the projection of the blocking surface of the blocking structure on the molded photosensitive assembly.

12. The camera module of claim 11, wherein an inner edge of the projection of the blocking surface of the blocking structure on the molded photosensitive assembly and an inner edge of the projection of the light-exit end surface of the lens barrel on the molded photosensitive assembly do not intersect.

13. The camera module of claim 9, wherein the strip shaped protrusion member extends along a long edge of the filter element.

14. The camera module of claim 13, wherein the blocking structure includes two strip shaped protrusion members, and the strip shaped protrusion members are respectively located outside of the two long edges of the filter element.

15. The camera module of claim 9, wherein the blocking structure further includes at least one buffer layer, and the buffer layer is arranged on the upper side surface of the strip shaped protrusion member, and the buffer layer is made of elastic material.

16. The camera module of claim 2, wherein the blocking structure includes at least one column shaped protrusion member, and one end of each column shaped protrusion member is connected to the molded photosensitive assembly, and the other end of the column shaped protrusion member extends in a direction away from the molded base, so as to form a point shaped protrusion, and an end surface of the other end of the column shaped protrusion member serves as the blocking surface of the blocking structure.

17. The camera module according to claim 16, wherein at least a part of the projection of the light-exit end surface of the lens barrel of the optical lens on the molded photosensitive assembly overlaps with the projection of the blocking surface of the blocking structure on the molded photosensitive assembly.

18. The camera module of claim 1, wherein the blocking structure is made of elastic material.

19. The camera module according to claim 1, wherein the motor of the motor camera lens assembly is directly mounted on the molded base of the molded photosensitive assembly or the blocking surface of the blocking structure.

20. An electronic device, characterized by comprising:
an electronic device body; and
at least one camera module according to claim 1, wherein each camera module is respectively arranged on the electronic device body for acquiring images.

* * * * *